US011923980B2

United States Patent
Ryu et al.

(10) Patent No.: US 11,923,980 B2
(45) Date of Patent: *Mar. 5, 2024

(54) HARQ FLUSH INDICATOR FOR UPLINK TRANSMISSIONS AND SIDELINK TRANSMISSIONS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Franklin Park, NJ (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/231,900

(22) Filed: Apr. 15, 2021

(65) Prior Publication Data

US 2021/0328721 A1   Oct. 21, 2021

Related U.S. Application Data

(60) Provisional application No. 63/011,940, filed on Apr. 17, 2020.

(51) Int. Cl.
*H04L 1/08* (2006.01)
*H04L 1/00* (2006.01)
(Continued)

(52) U.S. Cl.
CPC ............. *H04L 1/08* (2013.01); *H04L 1/0057* (2013.01); *H04L 1/1816* (2013.01); *H04W 72/20* (2023.01)

(58) Field of Classification Search
CPC ....... H04L 1/08; H04L 1/0057; H04L 1/1816; H04W 72/0406
See application file for complete search history.

(56) References Cited

U.S. PATENT DOCUMENTS

2009/0271679 A1   10/2009   Harada et al.
2017/0026297 A1    1/2017   Sun et al.
(Continued)

FOREIGN PATENT DOCUMENTS

| EP | 3621230 A1    | 3/2020 |
| WO | 2018143857 A1 | 8/2018 |
| WO | 2020005125 A1 | 1/2020 |

OTHER PUBLICATIONS

International Search Report and Written Opinion—PCT/US2021/027765—ISA/EPO—dated Jul. 26, 2021.
(Continued)

*Primary Examiner* — Jackie Zuniga Abad
(74) *Attorney, Agent, or Firm* — Procopio, Cory, Hargreaves & Savitch LLP/QUALCOMM Incorporated

(57) ABSTRACT

Apparatus, methods, and computer-readable media for facilitating a flush indicator for uplink transmissions and sidelink transmissions are disclosed herein. An example method for wireless communication at a UE includes transmitting a first transmission of one or more code blocks to a first device. Additionally, the example method includes retransmitting, to the first device, at least one code block of the one or more CBs. Further, the example method includes transmitting, to the first device, a flush indicator indicating to avoid combining a prior transmission of the at least one code block with the retransmission of the at least one code block.

35 Claims, 18 Drawing Sheets

(51) Int. Cl.
*H04L 1/1812* (2023.01)
*H04W 72/20* (2023.01)

(56) References Cited

U.S. PATENT DOCUMENTS

| | | | |
|---|---|---|---|
| 2018/0145797 | A1 | 5/2018 | Yeo et al. |
| 2018/0176903 | A1 | 6/2018 | Lee et al. |
| 2019/0074929 | A1 | 3/2019 | Aiba et al. |
| 2019/0140783 | A1 | 5/2019 | Yerramalli et al. |
| 2019/0356415 | A1 | 11/2019 | Peng et al. |
| 2020/0099474 | A1* | 3/2020 | Wikström ............ H04L 1/1864 |
| 2021/0006318 | A1 | 1/2021 | Kim et al. |
| 2021/0212086 | A1 | 7/2021 | Li et al. |
| 2021/0320755 | A1 | 10/2021 | Faxer et al. |
| 2021/0328723 | A1* | 10/2021 | Akkarakaran ........ H04L 1/1845 |
| 2021/0328727 | A1 | 10/2021 | Ryu |
| 2021/0385029 | A1* | 12/2021 | Guo ...................... H04L 5/0082 |
| 2022/0174682 | A1* | 6/2022 | Li .......................... H04W 72/10 |
| 2022/0217760 | A1* | 7/2022 | Iyer ........................ H04L 5/0053 |
| 2022/0240289 | A1 | 7/2022 | Karaki et al. |
| 2022/0255670 | A1 | 8/2022 | Zhang et al. |

OTHER PUBLICATIONS

3GPP Ts 38.214, "3rd Generation Partnership Project, Technical Specification Group Radio Access Network, NR, Physical Layer Procedures for Data (Release 15)", 3GPP TS 38.214, V15.9.0, Mar. 31, 2020 (Mar. 31, 2020), 105 Pages, sections 5-6, sections 5.1.7, 5.1.7.1 and 5.1.7.2.

Ericsson: "Feature Lead Summary #3 for Scheduling of Multiple DL/UL Transport Blocks for LTE-MTC", 3GPP Draft, 3GPP TSG-RAN WG1 Meeting #99, R1-1913448, 3rd Generation Partnership Project (3GPP), Mobile Competence Centre, 650, Route Des Lucioles, F-06921 Sophia-Antipolis Cedex, France, vol. RAN, WG1, No. Reno, USA, Nov. 18, 2019-Nov. 22, 2019, Nov. 25, 2019 (Nov. 25, 2019), XP051830727, 11 Pages, paragraph [0003].

Qualcomm Incorporated: "Potential Enhancements to DL Control Signalling", 3GPP Draft, 3GPP TSG RAN WG1 #82, R1-153859, Potential Enhancements to DL Control signalling, 3rd Generation Partnership Project (3GPP), Mobile Competence Centre, 650, Route Des Lucioles, F-06921 Sophia-Antipolis Cedex, vol. RAN WG1, No. Beijing, China, Aug. 24, 2015-Aug. 28, 2015, Aug. 23, 2015 (Aug. 23, 2015), XP051001296, 4 Pages, table.

ZTE: "Remaining Issues on Scheduling Enhancement for MTC", 3GPP Draft, 3GPP TSG RAN WG1 Meeting #100 bis, R1-2001852, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 24, 2020, Apr. 10, 2020 (Apr. 10, 2020), XP051873336, 17 Pages, p. 11.

* cited by examiner

HARQ FLUSH INDICATOR FOR UPLINK TRANSMISSIONS AND SIDELINK TRANSMISSIONS

CROSS REFERENCE TO RELATED APPLICATION(S)

This application claims the benefit of U.S. Provisional Patent Application Ser. No. 63/011,940, entitled "HARQ Flush Indicator for Uplink Transmissions and Sidelink Transmissions," and filed on Apr. 17, 2020, which is expressly incorporated by reference herein in its entirety.

INTRODUCTION

The present disclosure relates generally to communication systems, and more particularly, to communication systems utilizing code blocks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in vehicle-to-everything (V2X) and/or other device-to-device (D2D) communication. There exists a need for further improvements in communication over an uplink and/or a sidelink. These improvements may also be applicable to multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a user equipment (UE). The method includes transmitting a first transmission of one or more code blocks (CBs) to a first device. The method also includes receiving, from the first device, negative feedback for at least one CB of the first transmission. Additionally, the method includes retransmitting, to the first device, the at least one CB. The method further includes transmitting, to the first device, a flush indicator (FI) indicating to not combine a retransmission of the at least one CB with a prior transmission of the at least one CB.

In another aspect of the disclosure, an apparatus for wireless communication at a UE is provided. The apparatus includes means for transmitting a first transmission of one or more CBs to a first device. The apparatus also includes means for receiving, from the first device, negative feedback for at least one CB of the first transmission. Additionally, the apparatus includes means for retransmitting, to the first device, the at least one CB. The apparatus further includes means for transmitting, to the first device, an FI indicating to not combine a retransmission of the at least one CB with a prior transmission of the at least one CB.

In another aspect of the disclosure, an apparatus for wireless communication at a UE is provided. The apparatus includes memory and at least one processor coupled to the memory. The memory and the at least one processor are configured to transmit a first transmission of one or more CBs to a first device. The memory and the at least one processor may also be configured to receive, from the first device, negative feedback for at least one CB of the first transmission. Additionally, the memory and the at least one processor may be configured to retransmit, to the first device, the at least one CB. The memory and the at least one processor may further be configured to transmit, to the first device, an FI indicating to not combine a retransmission of the at least one CB with a prior transmission of the at least one CB.

In another aspect of the disclosure, a computer-readable medium storing computer executable code for wireless communication at a UE is provided. The code, when executed, causes a processor to transmit a first transmission of one or more CBs to a first device. The code, when executed, may also cause the processor to receive, from the first device, negative feedback for at least one CB of the first transmission. Additionally, the code, when executed, may cause the processor to retransmit, to the first device, the at least one CB. The code, when executed, may further cause the processor to transmit, to the first device, an FI indicating to not combine a retransmission of the at least one CB with a prior transmission of the at least one CB.

In another aspect of the disclosure, a method is provided for wireless communication at a first device. The method includes receiving, from a first UE a first transmission of one or more CBs. The method also includes transmitting, to the first UE, negative feedback for at least one CB of the first transmission. Additionally, the method includes receiving, from the first UE, a retransmission of the at least one CB. The method further includes receiving, from the first UE, an FI indicating to not combine the retransmission of the at least one CB with a prior transmission of the at least one CB.

In another aspect of the disclosure, an apparatus for wireless communication at a first device is provided. The apparatus includes means for receiving, from a first UE a first transmission of one or more CBs. The apparatus also includes means for transmitting, to the first UE, negative feedback for at least one CB of the first transmission. Additionally, the apparatus includes means for receiving, from the first UE, a retransmission of the at least one CB. The apparatus further includes means for receiving, from the first UE, an FI indicating to not combine the retransmission of the at least one CB with a prior transmission of the at least one CB.

In another aspect of the disclosure, an apparatus for wireless communication at a first device is provided. The apparatus includes memory and at least one processor coupled to the memory. The memory and the at least one processor are configured to receive, from a first UE a first transmission of one or more CBs. The memory and the at least one processor may also be configured to transmit, to the first UE, negative feedback for at least one CB of the first transmission. Additionally, the memory and the at least one processor may be configured to receive, from the first UE, a retransmission of the at least one CB. The memory and the at least one processor may further be configured to receive, from the first UE, an FI indicating to not combine the retransmission of the at least one CB with a prior transmission of the at least one CB.

In another aspect of the disclosure, a computer-readable medium storing computer executable code for wireless communication at a first device is provided. The code, when executed, causes a processor to receive, from a first UE a first transmission of one or more CBs. The code, when executed, may also cause the processor to transmit, to the first UE, negative feedback for at least one CB of the first transmission. Additionally, the code, when executed, may cause the processor to receive, from the first UE, a retransmission of the at least one CB. The code, when executed, may further cause the processor to receive, from the first UE, an FI indicating to not combine the retransmission of the at least one CB with a prior transmission of the at least one CB.

In another aspect of the disclosure, a method is provided for wireless communication at a user equipment (UE). The method includes transmitting a first transmission of one or more CBs to a first device. Additionally, the method includes retransmitting, to the first device, at least one CB of the one or more CBs. The method further includes transmitting, to the first device, a FI indicating to avoid combining a prior transmission of the at least one CB with the retransmission of the at least one CB.

In another aspect of the disclosure, an apparatus for wireless communication at a UE is provided. The apparatus includes means for transmitting a first transmission of one or more CBs to a first device. Additionally, the apparatus includes means for retransmitting, to the first device, at least one CB of the one or more CBs. The apparatus further includes means for transmitting, to the first device, a FI indicating to avoid combining a prior transmission of the at least one CB with the retransmission of the at least one CB.

In another aspect of the disclosure, an apparatus for wireless communication at a UE is provided. The apparatus includes memory and at least one processor coupled to the memory. The memory and the at least one processor are configured to transmit a first transmission of one or more CBs to a first device. Additionally, the memory and the at least one processor may be configured to retransmit, to the first device, at least one CB of the one or more CBs. The memory and the at least one processor may further be configured to transmit, to the first device, an FI indicating to avoid combining a prior transmission of the at least one CB with the retransmission of the at least one CB.

In another aspect of the disclosure, a computer-readable medium storing computer executable code for wireless communication at a UE is provided. The code, when executed, causes a processor to transmit a first transmission of one or more CBs to a first device. Additionally, the code, when executed, may cause the processor to retransmit, to the first device, at least one CB of the one or more CBs. The code, when executed, may further cause the processor to transmit, to the first device, an FI indicating to avoid combining a prior transmission of the at least one CB with the retransmission of the at least one CB.

In another aspect of the disclosure, a method is provided for wireless communication at a first device. The method includes receiving, from a first UE, a first transmission of one or more CBs. Additionally, the method includes receiving, from the first UE, a retransmission of at least one CB of the one or more CBs. The method further includes receiving, from the first UE, an FI indicating to avoid combining a prior transmission of the at least one CB with the retransmission of the at least one CB.

In another aspect of the disclosure, an apparatus for wireless communication at a first device is provided. The apparatus includes means for receiving, from a first UE, a first transmission of one or more CBs. Additionally, the apparatus includes means for receiving, from the first UE, a retransmission of at least one CB of the one or more CBs. The apparatus further includes means for receiving, from the first UE, an FI indicating to avoid combining a prior transmission of the at least one CB with the retransmission of the at least one CB.

In another aspect of the disclosure, an apparatus for wireless communication at a first device is provided. The apparatus includes memory and at least one processor coupled to the memory. The memory and the at least one processor are configured to receive, from a first UE, a first transmission of one or more CBs. Additionally, the memory and the at least one processor may be configured to receive, from the first UE, a retransmission of at least one CB of the one or more CBs. The memory and the at least one processor may further be configured to receive, from the first UE, an FI indicating to avoid combining a prior transmission of the at least one CB with the retransmission of the at least one CB.

In another aspect of the disclosure, a computer-readable medium storing computer executable code for wireless communication at a first device is provided. The code, when executed, causes a processor to receive, from a first UE, a first transmission of one or more CBs. Additionally, the code, when executed, may cause the processor to receive, from the first UE, a retransmission of at least one CB of the one or more CBs. The code, when executed, may further cause the processor to receive, from the first UE, an FI indicating to avoid combining a prior transmission of the at least one CB with the retransmission of the at least one CB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
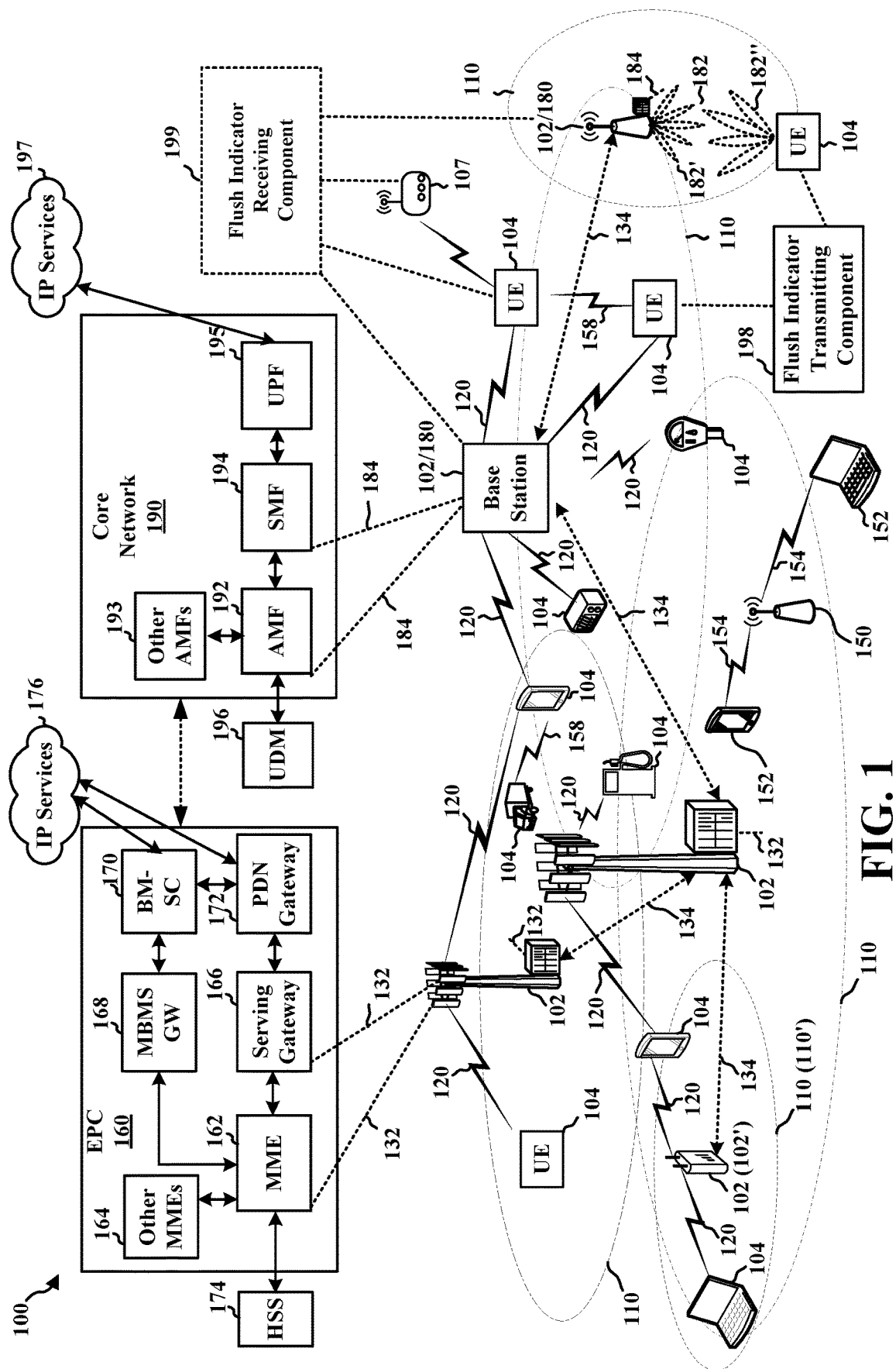
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

A transport block is a packet of data that is passed from the MAC layer to the physical layer of a transmitter. Before being transmitted via an over-an-air interface to a receiver, the physical layer may perform physical layer processing of the transport block. For example, the transmitter may provide error detection capability to the transport block by attaching cyclic redundancy check (CRC) bits to the transport block to form a segment. In some examples, the size of the segment may be larger than a maximum packet size and, thus, the transmitter may determine to perform code block segmentation to generate a plurality of code blocks. The transmitter may then provide error detection capability for the code blocks by attaching respective CRC bits to each of the code blocks to generate a plurality of packets.

The error detection capability may enable a receiver to determine whether a received transmission is successfully received. The receiver may then provide HARQ feedback to indicate to the transmitter when an error is detected in the received transmission (e.g., by transmitting a NACK message to the transmitter) or when no error is detected in the received transmission (e.g., by transmitting an ACK message to the transmitter).

In some examples, when the receiver detects an error in the received transmission, the receiver may buffer the received data and request a re-transmission. The receiver may then combine the buffered data with the re-transmitted data prior to performing channel decoding. Thus, HARQ feedback may facilitate improving the reliability of a data transmission by managing the transmission (and re-transmission) of data from the transmitter to the receiver.

In some examples, the receiver may perform HARQ feedback at a transport block level. For example, the receiver may transmit a single ACK/NACK message that is associated with the transport block. In such examples, if the receiver detects an error in any of the packets, the receiver transmits a single NACK message to the transmitter. In response to receiving the NACK message, the transmitter may re-transmit the entire transport block by re-transmitting each of the packets to the receiver. It may be appreciated that as the size of the transport block increases, the probability of an error being detected by the receiver in any of the packets also increases, which may result in an inefficient use of resources as the transmitter re-transmits large amounts of data (e.g., the entire transport block).

In some examples, the receiver may perform HARQ feedback at a code block level. For example, the receiver may transmit respective ACK/NACK messages for each of the code blocks. In some such examples, if the receiver detects an error in a packet, the receiver transmits a NACK message for the respective packet to the transmitter. In response to receiving the NACK message, the transmitter may re-transmit the respective packet to the receiver. It may be appreciated that, relative to employing HARQ feedback at the transport block level, performing HARQ feedback at the code block level may reduce the amount of data that may be transmitted, but may also increase the amount of signaling between the transmitter and the receiver as the receiver sends a separate ACK/NACK message for each packet instead of a single ACK/NACK message.

To reduce the amount of additional signaling between the transmitter and the receiver, and to refrain from retransmitting the full transport block in cases of a NACK message, some example techniques disclosed herein enable the receiver to perform HARQ feedback at a code block group level. A code block group may include one or more code blocks. A transport block may be segmented into any suitable quantity of code block groups, such as two code block groups, three code block groups, four code block groups, six code block groups, or eight code block groups.

In some examples in which the transport block is segmented into code block groups, the receiver may transmit respective ACK/NACK messages for each code block group. In some such examples, if the receiver detects an error in a packet, the receiver transmits a NACK message for the code block group that includes the respective packet to the transmitter. In response to receiving the NACK message, the transmitter may map the NACK message to the respective code block group and re-transmit the respective packets associated with the mapped code block group to the receiver.

In some examples, a first (or initial) transmission of a transport block may include all of the code block groups of the transport block. For example, a first (or initial) transmission of a transport block may include three code block groups (and their respective code blocks). In some such examples, a retransmission of the transport block may include the one or more code block groups associated with a negative feedback message. In some examples, a code block group transmission information (CBGTI) field may indicate which code block groups are included in a particular transmission. The CBGTI field may have a length based on the quantity of code block groups associated with the transport block. For example, the CBGTI field for the transport block may include three bits where the value of each bit indicates the presence or absence of the respective code block group in a transmission. Thus, it may be appreciated that the CBGTI field may be a bitmap where a first value (e.g., a "1") indicates that the respective code block group is included in the transmission and a second value (e.g., a "0") indicates that the respective code block group is not included in the transmission.

In some examples, a transmission may include a code block group flush indicator (CBGFI) to indicate whether the set of code block groups being retransmitted can be combined with previous transmission(s). For example, a receiver may apply combining between an original transmission of a message and retransmissions of the message to facilitate improving the decoding success rate. Thus, the CBGFI may be a binary value to indicate whether to combine buffered data with retransmit data or to avoid combining (e.g., "flush out") the buffered data. In some such examples, the CBGFI may be linked with the code block groups indicated by the CBGTI field. For example, the CBGTI field may indicate that a particular retransmission includes the first code block group and the third code block group. When the CBGFI is set to a first value (e.g., a "1"), the receiver receiving the transmission may determine to "flush out" or clear the buffered data associated with the first code block group and the third code block group. When the CBGFI is set to a second value (e.g., a "0"), the receiver receiving the transmission may combine the code blocks associated with the first code block group and the third code block group with the buffered code blocks associated with the respective packets.

Example techniques disclosed herein provide a flush indicator that is robust and that provides granular indications on whether a receiver is to combine or avoid combining (e.g., not to combine) data from prior transmissions. For example, disclosed techniques enable a transmitting device (e.g., a UE) to transmit an uplink transmission including a flush indicator. The flush indicator may be configured to indicate to the receiver (e.g., a base station) that data from a prior transmission is corrupted or invalid.

Example techniques disclosed herein additionally or alternatively enable the UE to transmit a sidelink transmission including the flush indicator. The flush indicator may be configured to indicate to the sidelink receiver (e.g., another UE) that data from a prior transmission is corrupted or invalid. In some examples, the UE may transmit the flush indicator in the sidelink transmission to the sidelink receiver.

In some examples, the UE may send the flush indicator to a base station that can forward the flush indicator to the sidelink receiver.

Furthermore, disclosed techniques enable the UE to transmit the flush indicator regardless of whether the UE transmission (e.g., an uplink transmission to a base station and/or a sidelink transmission to another UE) includes code block groups. That is, in some examples, the UE may decouple the transmission of the CBGTI with the flush indicator so that the flush indicator may be transmitted independent of whether a CBGTI is transmitted in the UE transmission. For example, in an uplink transmission, the UE may transmit a flush indicator independent of a CBGTI to a base station. In other examples, the UE may transmit a flush indicator in connection with a CBGTI to the base station. In a sidelink transmission, the UE may transmit a flush indicator independent of a sidelink CBGTI to the other UE. In other examples, the UE may transmit a flush indicator in connection with a sidelink CBGTI to the other UE. Furthermore, in some examples in which the UE relays communications between a base station and another UE, the UE may transmit a flush indicator to the other UE independent of a Uu CBGTI (e.g., from the base station). In other examples, the UE may transmit a flush indicator to the other UE in connection with the Uu CBGTI (e.g., from the base station).

Furthermore, disclosed techniques enable implementing the flush indicator via an N-bit field so that each bit of the flush indicator field corresponds to a respective code block group. By employing an N-bit field for the flush indicator, the flush indicator may control the flushing or combining of respective code block groups at a code block group level, rather than the code block groups indicated by the CBGTI. For example, referring to the example in which the CBGTI indicates that a particular retransmission includes the first code block group and the third code block group, disclosed techniques enable the flush indicator to be an N-bit field so that each bit corresponds to a different one of the code block groups. In some such examples, a first value of a bit of the flush indicator may indicate whether to combine or to avoid combining the code blocks associated with the first code block group and a different value of a bit of the flush indicator may indicate whether to combine or to avoid combining the code blocks associated with the third code block group.

In some examples, the length of the CBGTI field (e.g., M-bits) may be the same as the length of the flush indicator field (e.g., N-bits). For example, the CBGTI field may be a three-bit field and the flush indicator field may be a three-bit field (e.g., M and N are both three). In some examples, the length of the CBGTI field may be different than the length of the flush indicator field. For example, the CBGTI field may be a three-bit field and the flush indicator field may be a two-bit field (e.g., M=3 and N=2). In examples in which the lengths of the CBGTI and the flush indicator are different, one or more code blocks may be associated with different code block groups with respect to the CBGTI and the flush indicator.

In some examples, the presence of the flush indicator and/or the length of the flush indicator may be configured by a base station, by the transmitting UE in a sidelink transmission, and/or by the receiving UE in a sidelink transmission. For example, when communicating with a base station, the presence of the flush indicator and/or the length of the flush indicator may be configured through DCI, a medium access control-control element (MAC-CE), and/or RRC signaling. In sidelink, the presence of the flush indicator and/or the length of the flush indicator may be configured through sidelink control information (SCI) and/or by a centralized resource allocation mode (e.g., a "resource allocation mode 1") grant DCI (e.g., DCI that provides resource allocations for sidelink communication).

Thus, it may be appreciated that aspects presented herein may improve communication between a transmitter and a receiver by providing a flush indicator in uplink transmissions and/or sidelink transmissions. The transmitter may be a UE and configured to transmit uplink transmissions to the receiver (e.g., a base station) and/or configured to transmit sidelink transmissions to the receiver (e.g., another UE). The transmitter may also be configured to receive feedback at a transport block level, at a code block level, or at a code block group level. The flush indicator may be configured to be a single-bit field or a multi-bit field. In some examples, the flush indicator may be configured to cause the receiver to flush a prior transmission.

FIG. 1 is a diagram illustrating an example of a wireless communications system and an access network 100 that includes UEs 104 in communication with base stations 102 or base stations 180. FIG. 1 also illustrates UEs 104 and other devices, such as road side unit (RSU) 107 in direct communication, e.g., based on sidelink. As an example, in FIG. 1, the UE 104 may include a flush indicator transmitting component 198. In certain aspects, the flush indicator transmitting component 198 may be configured to transmit a first transmission of one or more CBs to a first device (e.g., to a base station 102/180 or to another UE 104). The example flush indicator transmitting component 198 may also be configured to receive, from the first device, negative feedback for at least one CB of the first transmission. Additionally, the example flush indicator transmitting component 198 may be configured to retransmit, to the first device, the at least one CB. Further, the example flush indicator transmitting component 198 may be configured to transmit, to the first device, an FI indicating to not combine a retransmission of the at least one CB with a prior transmission of the at least one CB.

In another aspect, the flush indicator transmitting component 198 may be configured to transmit a first transmission of one or more CBs to a first device (e.g., to a base station 102/180 or to another UE 104). The example flush indicator transmitting component 198 may also be configured to retransmit, to the first device, at least one CB of the one or more CBs. Further, the example flush indicator transmitting component 198 may be configured to transmit, to the first device, an FI indicating to avoid combining a prior transmission of the at least one CB with the retransmission of the at least one CB.

As illustrated in FIG. 1, in some aspects, a receiving UE 104 may include a flush indicator receiving component 199 that is configured to receive an FI indicating to not combine (e.g., to avoid combining or to forego combining) a retransmission of the at least one CB with a prior transmission of the at least one CB.

Still referring to FIG. 1, in certain aspects, the base station 102/180 and/or the UE 104 may include the flush indicator receiving component 199. In certain aspects, the flush indicator receiving component 199 may be configured to receive, from a first UE a first transmission of one or more CBs. The example flush indicator receiving component 199 may also be configured to transmit, to the first UE, negative feedback for at least one CB of the first transmission. Additionally, the example flush indicator receiving component 199 may be configured to receive, from the first UE, a retransmission of the at least one CB. Further, the example flush indicator receiving component 199 may be configured to receive, from the first UE, an FI indicating to not combine the retransmission of the at least one CB with a prior transmission of the at least one CB.

In another aspect, the flush indicator receiving component 199 may be configured to receive, from a first UE, a first transmission of one or more CBs. The example flush indicator receiving component 199 may also be configured to receive, from the first UE, a retransmission of at least one CB of the one or more CBs. Further, the example flush indicator receiving component 199 may be configured to receive, from the first UE, an FI indicating to avoid combining a prior transmission of the at least one CB with the retransmission of the at least one CB.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication, such as described in connection with FIG. 5A. Although the following description, including the example slot structure of FIG. 5A, may provide examples for V2X/D2D communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
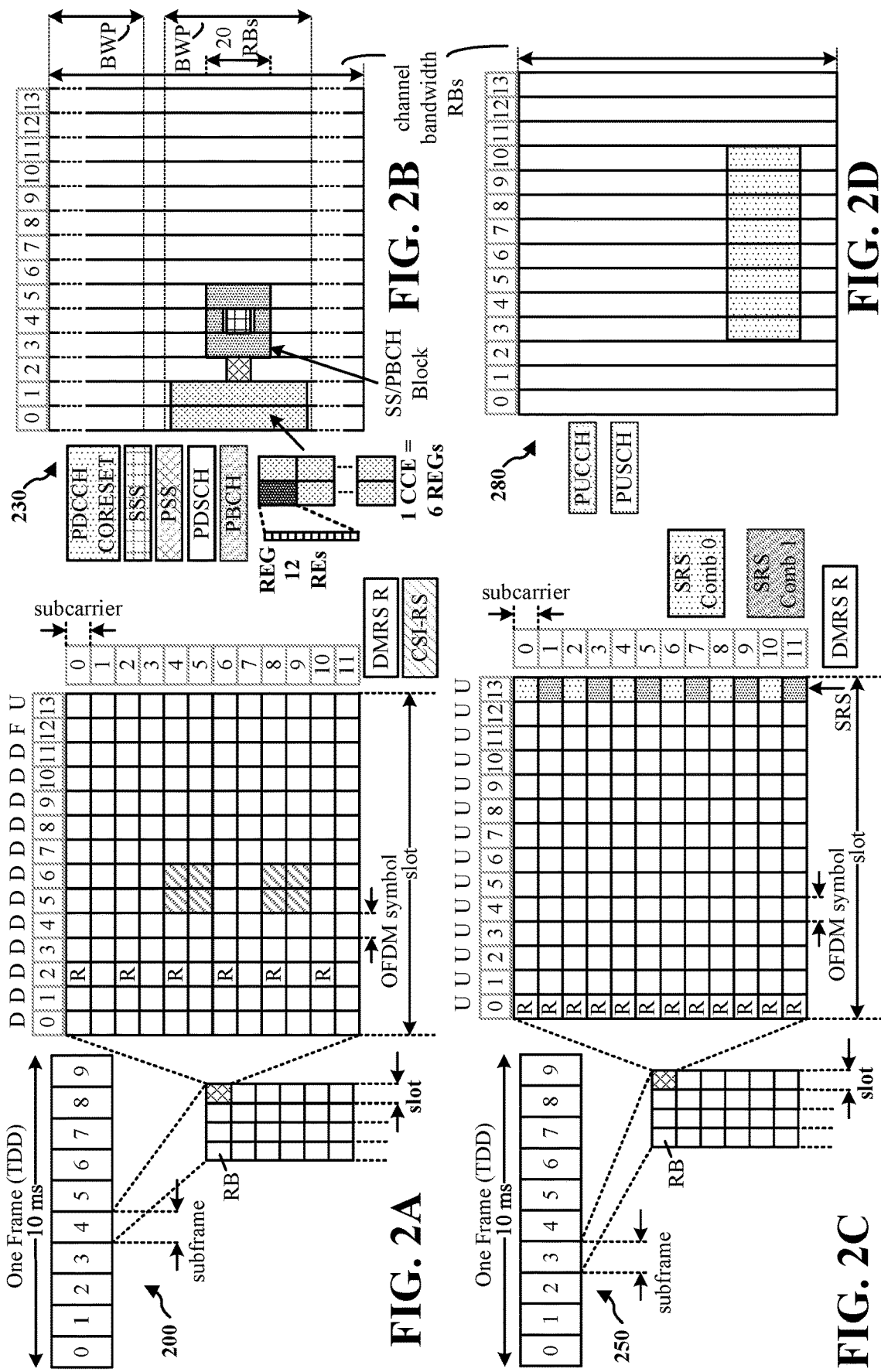
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^{\mu}$ slots/subframe. The subcarrier spacing and symbol length/duration are a function of the numerology. The subcarrier spacing may be equal to $2^{\mu}*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
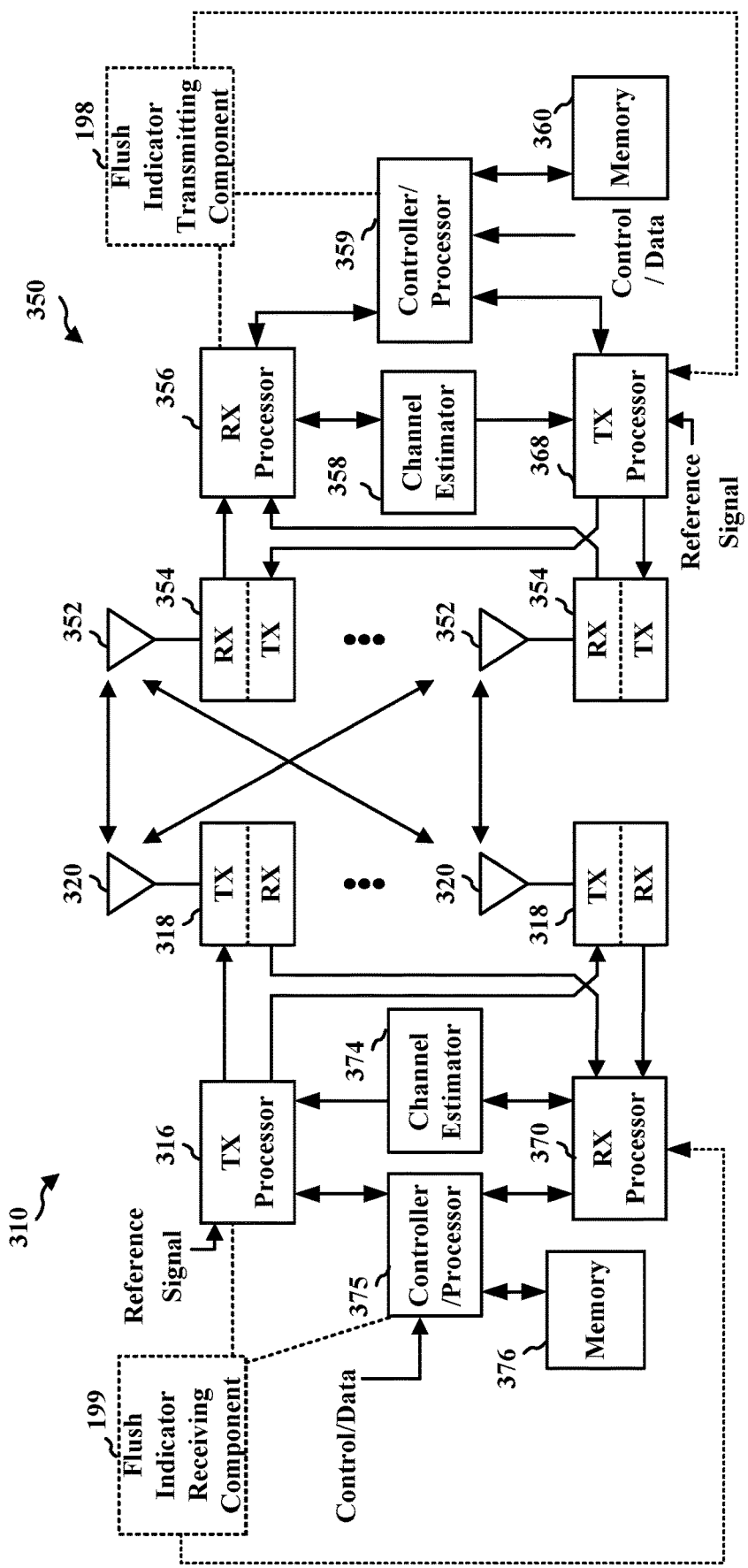
FIG. 3 is a diagram illustrating an example of a first device configured for wireless communication with a second device in an access network.

FIG. 3 is a block diagram 300 of a first device 310 configured for wireless communication with a second device 350. In some examples, the first device 310 may correspond to a base station (e.g., the base station 102 or 180 in FIG. 1), and the second device 350 may correspond to a UE (e.g., the UE 104 in FIG. 1) that communicates with the base station over an access link using a Uu interface. In some examples, the devices 310, 350 may be configured to transmit and/or receive V2X or other D2D communication. The communication may be based, e.g., on sidelink, and may be exchanged using a PC5 interface. In such examples the devices 310, 350 may comprise a UE, an RSU, or another wireless device communicating using V2X or D2D. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second device 350. Each spatial stream may then be provided to a different antenna 320 via a separate transmitter 318 TX. Each transmitter 318 TX may modulate an RF carrier with a respective spatial stream for transmission.

At the second device 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the second device 350. If multiple spatial streams are destined for the second device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first device 310. These soft decisions may be based on channel estimates computed by a channel estimator 358. The soft decisions are then decoded and deinterleaved to recover the data and control signals that were originally transmitted by the first device 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the first device 310 in a manner similar to that described in connection with the receiver function at the second device 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, and control signal processing. The controller/processor 375 is also responsible for error detection using an ACK and/or NACK protocol to support HARQ operations.

As noted above, the concepts described herein may be applicable to V2X, D2D, or other communication, such as uplink/downlink communication over an access link. For example, the first device 310 may be implemented by a base station, such as the base station 102/180 of FIG. 1, and the second device 350 may be implemented by a UE, such as the UE 104 of FIG. 1. In the DL, IP packets from the EPC 160 and/or core network 190 may be provided to the control/processor 375. An UL transmission is processed at the first device 310 (e.g., a base station) in a manner similar to that described in connection with the receiver function at the second device 350 (e.g., a UE).

At least one of the TX processor 368, the RX processor 356, and the controller/processor 359 may be configured to perform aspects in connection with the flush indicator transmitting component 198 of FIG. 1.

At least one of the TX processor 316, the RX processor 370, and the controller/processor 375 may be configured to perform aspects in connection with the flush indicator receiving component 199 of FIG. 1.

A transport block is a packet of data that is passed from the MAC layer to the physical layer of a transmitter. Before being transmitted via an over-an-air interface to a receiver, the physical layer may perform physical layer processing of the transport block. For example, the physical layer of the transmitter may provide error detection capabilities, perform code block segmentation of a large transport block to ensure that a size of each code block does not exceed a maximum packet size, etc.

Figure 4:
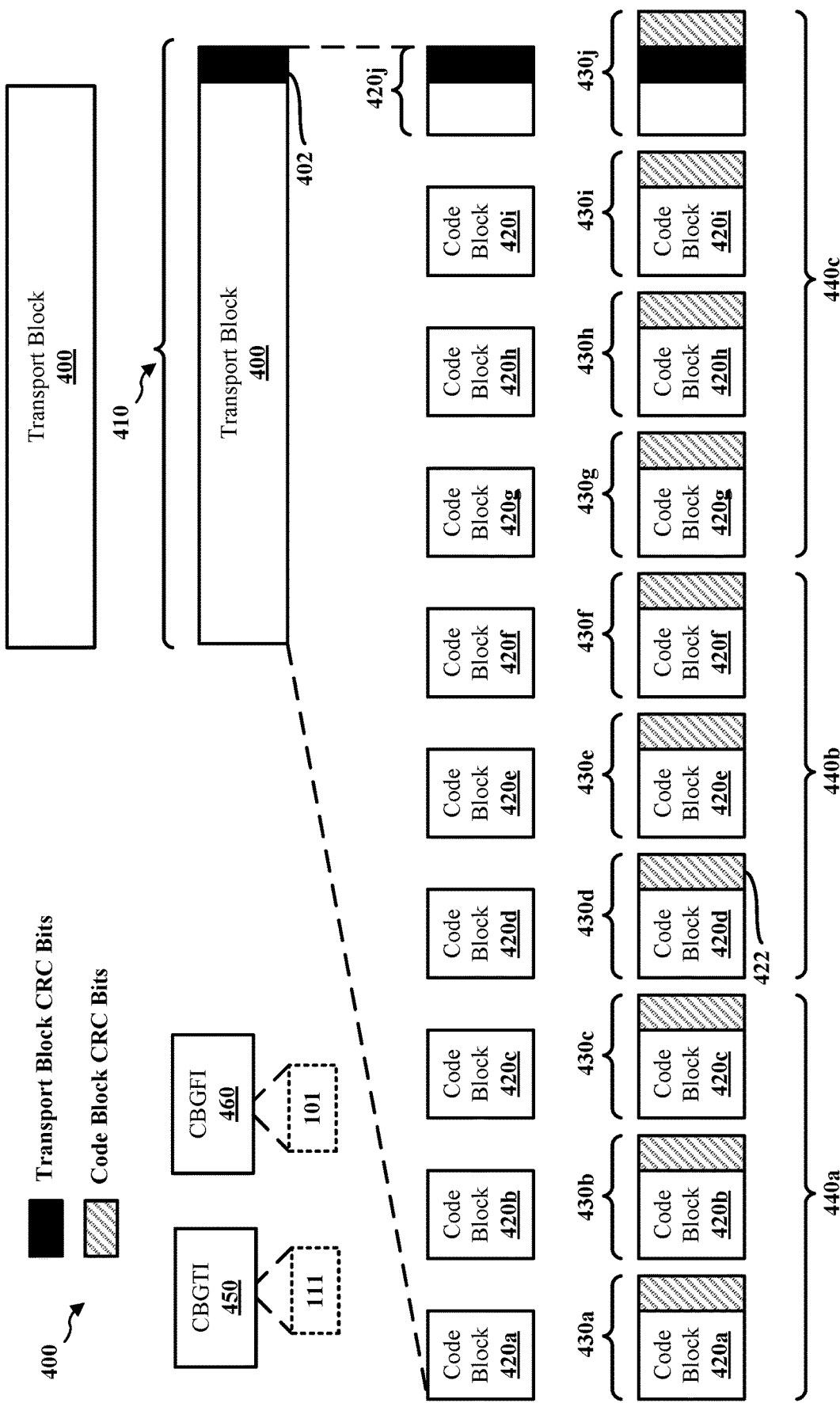
FIG. 4 is a diagram illustrating an example transport block segmented into code blocks and code block groups, in accordance with one or more techniques disclosed herein.

FIG. 4 depicts an example of code block segmentation of an example transport block 400, in accordance with one or more techniques disclosed herein. In the illustrated example, the transport block 400 may be passed from the MAC layer of a transmitter to the physical layer of the transmitter to perform physical layer processing. The transmitter may provide error detection capability to the transport block 400 by attaching cyclic redundancy check (CRC) bits 402 to the transport block 400 to form a segment 410. In the example of FIG. 4, the size of the segment 410 is larger than a maximum packet size and, thus, the transmitter may determine to perform code block segmentation to generate a plurality of code blocks. In the illustrated example of FIG. 4, the transmitter generates ten example code blocks 420a-420j that each have a size that is less than a maximum packet size, such as 3840 bits or 8448 bits. The transmitter may then provide error detection capability for the code blocks 420a-420j by attaching respective CRC bits 422 to each of the code blocks 420a-420j to generate a plurality of packets 430a-430j. In the illustrated example, the size of each of the packets 430a-430j is less than the maximum packet size.

The error detection capability (e.g., the CRC bits 402 and the CRC bits 422) may enable a receiver to determine whether a received transmission (e.g., the packets 430a-430j) is successfully received. The receiver may then provide HARQ feedback to indicate to the transmitter when an error is detected in the received transmission (e.g., by transmitting a NACK message to the transmitter) or when no error is detected in the received transmission (e.g., by transmitting an ACK message to the transmitter).

In some examples, when the receiver detects an error in the received transmission, the receiver may buffer the received data in a decoding buffer and request a re-transmission. The receiver may then combine the buffered data with the re-transmitted data prior to performing channel decoding. Thus, HARQ feedback may facilitate improving the reliability of a data transmission by managing the transmission (and re-transmission) of data from the transmitter to the receiver.

In some examples, the receiver may perform HARQ feedback at a transport block level. For example, the receiver may transmit a single ACK/NACK message that is associated with the transport block. In such examples, if the receiver detects an error in any of the packets 430a-430j, the receiver transmits a single NACK message to the transmitter. In response to receiving the NACK message, the transmitter may re-transmit the entire transport block 400 by re-transmitting each of the packets 430a-430j to the receiver. It may be appreciated that as the size of the transport block 400 increases, the probability of an error being detected by the receiver in any of the packets 430a-430j also increases, which may result in an inefficient use of resources as the transmitter re-transmits large amounts of data (e.g., the entire transport block 400).

In some examples, the receiver may perform HARQ feedback at a code block level. For example, the receiver may transmit respective ACK/NACK messages for each of the code blocks. In some such examples, if the receiver detects an error in a packet (e.g., the packet 430a), the receiver transmits a NACK message for the respective packet (e.g., the packet 430a) to the transmitter. In response to receiving the NACK message, the transmitter may re-transmit the respective packet (e.g., the packet 430a) to the receiver. It may be appreciated that, relative to employing HARQ feedback at the transport block level, performing HARQ feedback at the code block level may reduce the amount of data that may be transmitted, but may also increase the amount of signaling between the transmitter and the receiver as the receiver sends a separate ACK/NACK message for each packet (e.g., for each of the packets 430a-430j) instead of a single ACK/NACK message.

To reduce the amount of additional signaling between the transmitter and the receiver, and to refrain from retransmitting the full transport block in cases of a NACK message, some example techniques disclosed herein enable the receiver to perform HARQ feedback at a code block group level. A code block group may include one or more code blocks. For example, in the illustrated example of FIG. 4, the example code blocks 420a-420j are segmented into three example code block groups (e.g., a first code block group 440a including the code blocks 420a to 420c, a second code block group 440b including the code blocks 420d to 420f, and a third code block group 440c including the code blocks 420g to 420j). Although the example of FIG. 4 illustrates three example code block groups, it may be appreciated that in additional or alternative examples, the transport block 400 (and/or the segment 410) may be segmented into any suitable quantity of code block groups, such as two code block groups, four code block groups, six code block groups, or eight code block groups.

In some examples in which the transport block is segmented into code block groups, the receiver may transmit respective ACK/NACK messages for each code block group. In some such examples, if the receiver detects an error in a packet (e.g., the packet 430a), the receiver transmits a NACK message for the code block group that includes the respective packet (e.g., the first code block group 440a) to the transmitter. In response to receiving the NACK message, the transmitter may map the NACK message to the respective code block group and re-transmit the respective packets associated with the mapped code block group (e.g., the packets 430a to 430c) to the receiver.

In some examples, a first (or initial) transmission of a transport block may include all of the code block groups of the transport block. For example, a first (or initial) transmission of the transport block 400 of FIG. 4 may include the three code block groups 440a, 440b, 440c (and their respective code blocks 420a-420j and corresponding packets 430a-430j). In some such examples, a retransmission of the transport block may include the one or more code block groups associated with a negative feedback message. In some examples, a code block group transmission information (CBGTI) field 450 may indicate which code block groups are included in a particular transmission. The CBGTI field 450 may have a length based on the quantity of code block groups associated with the transport block. For example, the CBGTI field 450 for the transport block 400 of FIG. 4 may include three bits where the value of each bit indicates the presence or absence of the respective code block group in a transmission. Thus, it may be appreciated that the CBGTI field may be a bitmap where a first value (e.g., a "1") indicates that the respective code block group is included in the transmission and a second value (e.g., a "0") indicates that the respective code block group is not included in the transmission. As shown in FIG. 4, the CBGTI field 450 includes three bits "111" indicating that the code blocks groups 440a, 440b, 440c are included in a transmission.

some examples, a transmission may include a code block group flush indicator (CBGFI) 460 to indicate whether the set of code block groups being retransmitted can be combined with previous transmission(s). For example, a receiver may apply combining between an original transmission of a message and retransmissions of the message to facilitate improving the decoding success rate. Thus, the CBGFI 460 may be a binary value to indicate whether to combine buffered data with retransmit data or to avoid combining (e.g., "flush out") the buffered data. In some such examples, the CBGFI 460 may be linked with the code block groups indicated by the CBGTI field 450. For example, the CBGTI field 450 may indicate that a particular retransmission includes the first code block group 440a and the third code block group 440c of FIG. 4. When the CBGFI 460 is set to a first value (e.g., a "1"), the receiver receiving the transmission may determine to "flush out" or clear the buffered data in the decoding buffer that is associated with the first code block group 440a (e.g., the code blocks 420a to 420c) and the third code block group 440c (e.g., the code blocks 420g to 420j). When the CBGFI 460 is set to a second value (e.g., a "0"), the receiver receiving the transmission may combine the code blocks associated with the first code block group 440a and the third code block group 440c with the buffered code blocks associated with the respective packets in the decoding buffer. As shown in FIG. 4, the CBGFI 460 includes three bits "101" indicating that the receiver is to flush out the buffered data associated with the first code block group 440a and the third code block group 440c and to combine the code blocks associated with the second code block group 440b with the buffered code blocks associated with the respective packets.

Example techniques disclosed herein provide a flush indicator that is robust and that provides granular indications on whether a receiver is to combine or avoid combining (e.g., not to combine) data from prior transmissions. For example, disclosed techniques enable a transmitting device (e.g., a UE) to transmit an uplink transmission including a flush indicator. The flush indicator may be configured to indicate to the receiver (e.g., a base station) that data from a prior transmission is corrupted or invalid.

Example techniques disclosed herein additionally or alternatively enable the UE to transmit a sidelink transmission including the flush indicator. The flush indicator may be configured to indicate to the sidelink receiver (e.g., another UE) that data from a prior transmission is corrupted or invalid. In some examples, the UE may transmit the flush indicator in the sidelink transmission to the sidelink receiver. In some examples, the UE may send the flush indicator to a base station that can forward the flush indicator to the sidelink receiver.

Furthermore, disclosed techniques enable the UE to transmit the flush indicator regardless of whether the UE transmission (e.g., an uplink transmission to a base station and/or a sidelink transmission to another UE) includes code block groups. That is, in some examples, the UE may decouple the transmission of the CBGTI with the flush indicator so that the flush indicator may be transmitted independent of whether a CBGTI is transmitted in the UE transmission. For example, in an uplink transmission, the UE may transmit a flush indicator independent of a CBGTI to a base station. In other examples, the UE may transmit a flush indicator in connection with a CBGTI to the base station. In a sidelink transmission, the UE may transmit a flush indicator independent of a sidelink CBGTI to the other UE. In other examples, the UE may transmit a flush indicator in connection with a sidelink CBGTI to the other UE. Furthermore, in some examples in which the UE relays communications between a base station and another UE, the UE may transmit a flush indicator to the other UE independent of a Uu CBGTI (e.g., from the base station). In other examples, the UE may transmit a flush indicator to the other UE in connection with the Uu CBGTI (e.g., from the base station).

Furthermore, disclosed techniques enable implementing the flush indicator via an N-bit field so that each bit of the flush indicator field corresponds to a respective code block group. As shown in FIG. 4, the CBGFI 460 includes three bits so that the first bit corresponds to the first code block group 440a, the second bit corresponds to the second code block group 440b, and the third bit corresponds to the third code block group 440c. By employing an N-bit field for the flush indicator, the flush indicator may control the flushing or combining of respective code block groups at a code block group level, rather than the code block groups indicated by the CBGTI. For example, referring to the example in which the CBGTI indicates that a particular retransmission includes the first code block group 440a and the third code block group 440c (e.g., the CBGTI field 450 set to a value "101"), disclosed techniques enable the flush indicator to be an N-bit field so that each bit corresponds to a different one of the code block groups 440a-440c. In some such examples, a first value of a bit of the flush indicator may indicate whether to combine or to avoid combining the code blocks associated with the first code block group 440a (e.g., the code blocks 420a to 420c) and a different value of a bit of the flush indicator may indicate whether to combine or to avoid combining the code blocks associated with the third code block group 440c (e.g., the code blocks 420g to 420j).

In some examples, the length of the CBGTI field (e.g., M-bits) may be the same as the length of the flush indicator field (e.g., N-bits). For example, the CBGTI field may be a three-bit field and the flush indicator field may be a three-bit field (e.g., M and N are both three, as shown in the example of FIG. 4). In some examples, the length of the CBGTI field may be different than the length of the flush indicator field. For example, the CBGTI field may be a three-bit field and the flush indicator field may be a two-bit field (e.g., M=3 and N=2). In examples in which the lengths of the CBGTI and the flush indicator are different, one or more code blocks may be associated with different code block groups with respective to the CBGTI and the flush indicator.

In some examples, the presence of the flush indicator and/or the length of the flush indicator may be configured by a base station, by the transmitting UE in a sidelink transmission, and/or by the receiving UE in a sidelink transmission. For example, when communicating with a base station, the presence of the flush indicator and/or the length of the flush indicator may be configured through DCI, a medium access control-control element (MAC-CE), and/or RRC signaling. In sidelink, the presence of the flush indicator and/or the length of the flush indicator may be configured through sidelink control information (SCI) and/or by a centralized resource allocation mode (e.g., a "resource allocation mode 1") grant DCI (e.g., DCI that provides resource allocations for sidelink communication).

A sidelink-capable device, such as a UE, may autonomously determine resources for sidelink transmissions by sensing, or monitoring, for reservations of other sidelink-capable devices. The autonomous resource selection may be referred to as "resource allocation mode 2," a "decentralized" resource allocation mode, or a sensing-based sidelink resource allocation mode, e.g., where each sidelink-capable device selects its own sidelink resources for sidelink transmissions. In contrast to a centralized resource allocation mode (e.g., a resource allocation mode 1) in which a network entity may assign sidelink resources, in the decentralized sidelink resource allocation mode, a UE may autonomously select sidelink transmission resources based on a sensing and resource reservation procedure.

Figures 5A, 5B:
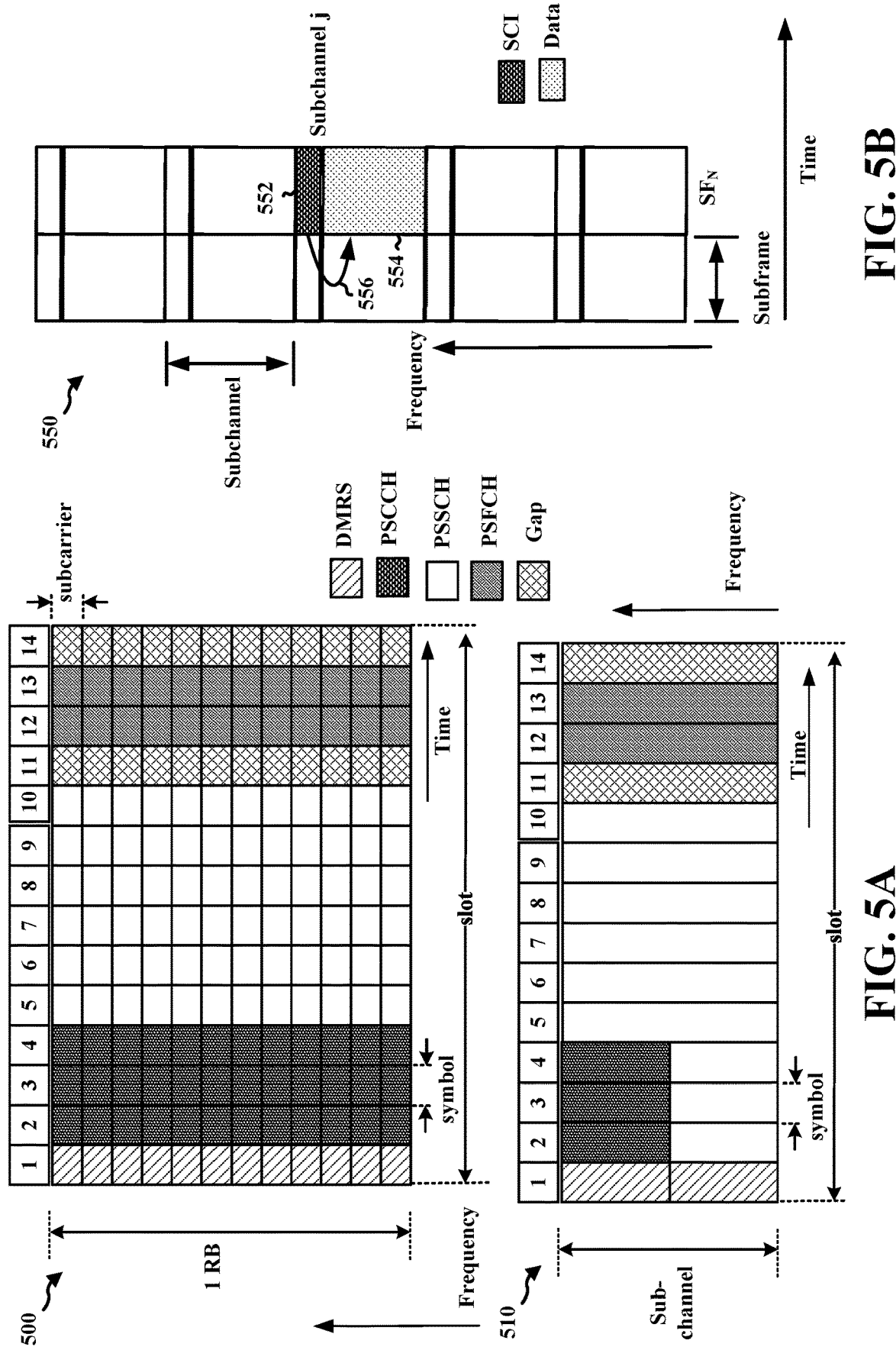
FIG. 5A illustrates example aspects of a sidelink slot structure.
FIG. 5B illustrates an example of a sidelink transmission.

FIG. 5A includes diagrams 500 and 510 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 5A is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 500 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 510 in FIG. 5A illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 5A, some of the REs may comprise control information in PSCCH and some Res may comprise demodulation RS (DMRS). At least one symbol may be used for feedback. FIG. 5A illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 5A. Multiple slots may be aggregated together in some examples.

FIG. 5B illustrates an example diagram 550 of sidelink communication. Although FIG. 5B illustrates the concept using subframes, the aspects may be similarly applied to communication based on slots or other timing information. A transmission includes sidelink control information (SCI) 552 and data 554, such as the example transport block 400 of FIG. 4. The example in FIG. 5B illustrates the SCI 552 and the data 554 in adjacent frequency resources. This is merely one example to illustrate the concept of a transmission including data and SCI. The SCI 552 and the data 554 may alternatively be transmitted in non-adjacent frequency resources in other examples. The SCI 552 may be transmitted in a PSCCH, and the data 554 may be transmitted in a PSSCH. As illustrated by arrow 556, the SCI 552 includes information about the data 554 that enables receiving devices to receive the data 554, e.g., MCS information, information about the frequency and/or time resources used to transmit the data, whether the data is an initial transmission or a retransmission, etc. In some examples, the transmission (e.g., data 554) may be an initial transmission. In some examples, the transmission (e.g., data 554) may be a retransmission of a previous, initial transmission. In examples in which the transmission is a retransmission, the SCI 552 may indicate resources for the retransmission.

The SCI 552 may carry information about the time and/or frequency of the resources for a subsequent transmission. As illustrated, the SCI 552 may carry information about a time gap (e.g., subframe gap) between the two transmissions, information about frequency resources for the second transmission (e.g., a starting subchannel).

Figure 6:
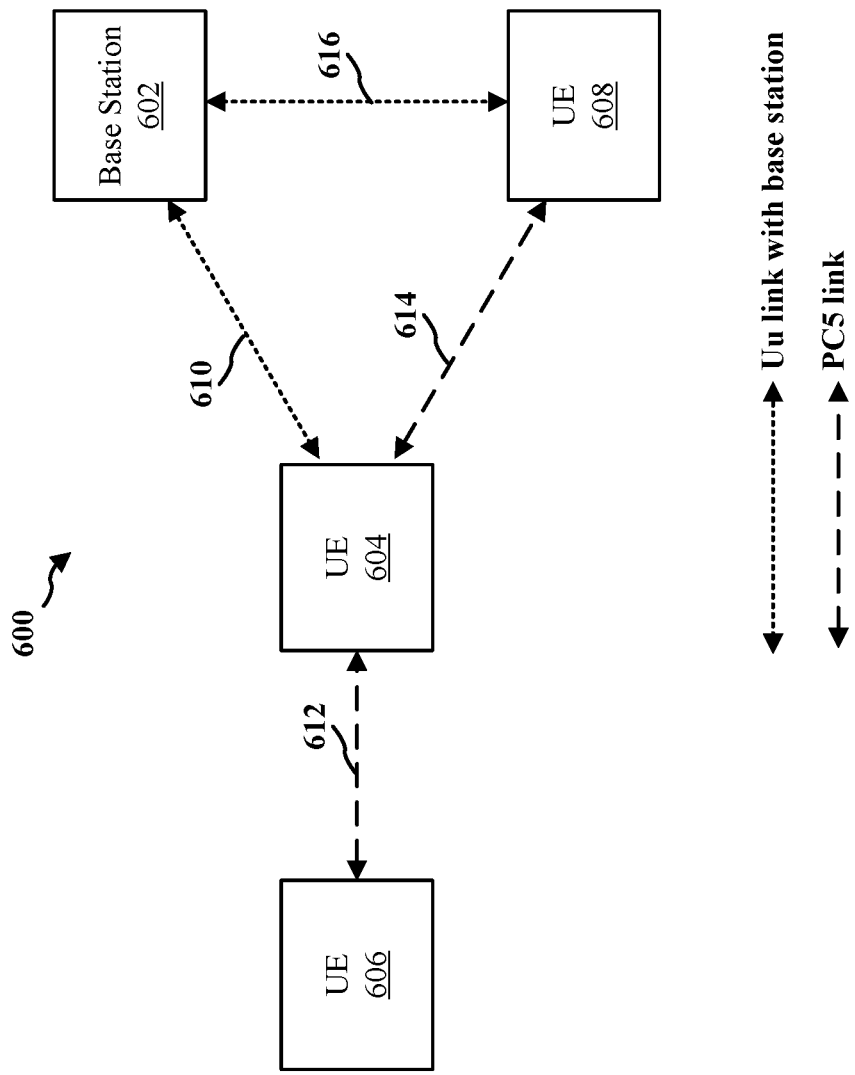
FIG. 6 illustrates example aspects of a wireless communication system including a base station, first UE(s), and second UEs, in accordance with one or more techniques disclosed herein.

FIG. 6 illustrates communication systems 600 that include one or more UEs and a base station, as presented herein. In FIG. 6 the communication system 600 includes a base station 602, a first UE 604, a second UE 606, and a third UE 608. As illustrated, a link 610 between the base station 602 and the first UE 604 may be based on a Uu interface. Links between the base station 602, the second UE 606, and/or the third UE 608 may also be based on a Uu interface. Link 612 between the first UE 604 and the second UE 606, and link 614 between the first UE 604 and the third UE 608 may be based on a PC5 interface. The first UE 604 in FIG. 6 may operate similar to a UE or as a sidelink device. The first UE 604 in FIG. 6 may use the base station 602 as a system controller. The base station 602 may perform interference management (IM) across multiple first UEs 604. The base station 602 may handle other network functions for the second UE 606 and/or the third UE 608, such as initial access with the network, mobility, etc. As shown, the second UE 606 and the third UE 608 of FIG. 6 communicate with the first UE 604 based on sidelink. One or more of the UEs, e.g., the UEs 604, 606, 608, may communicate with the base station 602 based on uplink/downlink, for example, the third UE 608 may support both Uu and PC5 based communication (e.g., based on the link 614 with the first UE 604 and a link 616 with the base station 602). As the first UE 604 communicates with the second UE 606 and the third UE 608 based on sidelink (e.g., using the links 612, 614, respectively) and with the base station 602 based on uplink/downlink (e.g., using the link 610), the first UE 604 supports both Uu and PC5 based communication.

Figure 7:
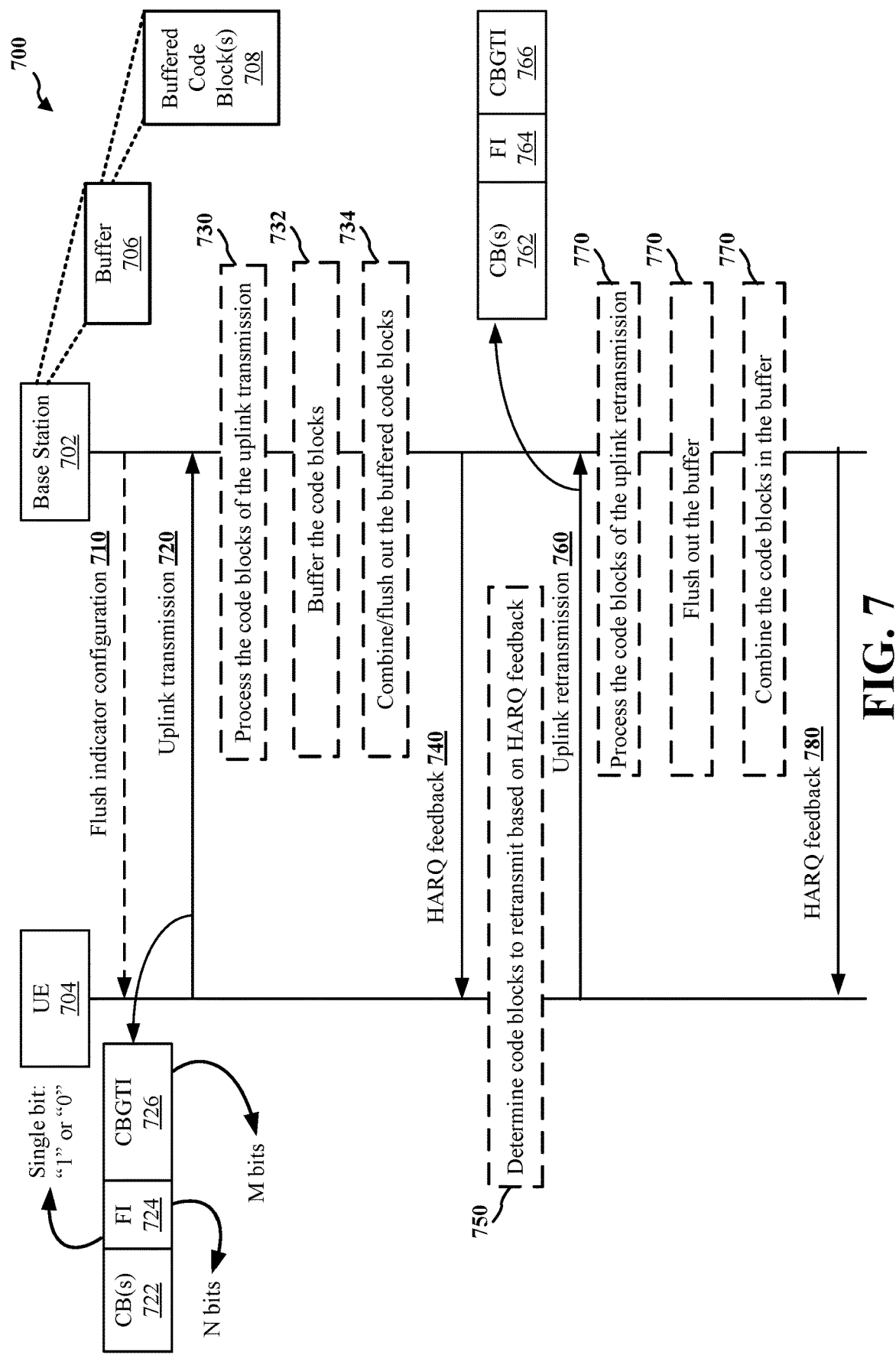
FIG. 7 is an example communication flow between a base station and a UE, in accordance with one or more techniques disclosed herein.

FIG. 7 illustrates an example communication flow 700 between a base station 702 and a UE 704, in accordance with one or more techniques disclosed herein. Aspects of the base station 702 may be implemented by the base station 102/180, the first device 310, and/or the base station 602. Aspects of the UE 704 may be implemented by the UE 104, the second device 350, and/or the first UE 604.

In the illustrated example of FIG. 7, the base station 702 is connected with (e.g., in communication with) the UE 704. Although not shown in the illustrated example of FIG. 7, it may be appreciated that in additional or alternative examples, the base station 702 may be in communication with one or more other base stations or UEs, and/or the UE 704 may be in communication with one or more other base stations or UEs.

In the illustrated example of FIG. 7, the base station 702 may transmit a flush indicator configuration 710 that is received by the UE 704. The flush indicator configuration 710 may indicate to the UE 704 a presence of the flush indicator and/or a length of the flush indicator. For example, the flush indicator configuration 710 may indicate whether the flush indicator is a single-bit field or a multiple-bit field.

In some examples in which the flush indicator is configured as a single-bit field, a first value of the flush indicator may indicate to the UE 704 to flush (or discard) buffered data in a decoding buffer that is associated with prior transmissions, and a second value of the flush indicator may indicate to the UE 704 to combine the code blocks of an instant transmission with those of prior transmission(s).

In some examples in which the flush indicator is configured as a multi-bit field, each bit of the flush indicator may correspond to a respective code block of a transport block. For example, with respect to the illustrated example of FIG. 4, the flush indicator configuration 710 may indicate that the flush indicator is a ten-bit field, where the first bit of the flush indicator corresponds to the first code block 420*a*, the second bit of the flush indicator corresponds to the second code block 420*b*, . . . , and the tenth bit of the flush indicator corresponds to the tenth code block 420*j* of the transport block 400.

In some examples in which the flush indicator is configured as a multiple-bit field, the flush indicator configuration 710 may include a grouping of code blocks associated with each bit of the multiple-bit flush indicator. For example, with respect to the illustrated example of FIG. 4, the flush indicator configuration 710 may indicate that the flush indicator is a three-bit field, where the first bit of the flush indicator corresponds to the first code block group 440*a* (e.g., including the code blocks 420*a*, 420*b*, 420*c*), the second bit of the flush indicator corresponds to the second code block group 440*b* (e.g., including the code blocks 420*d*, 420*e*, 420*f*), and the third bit of the flush indicator corresponds to the third code block group 440*c* (e.g., including the code blocks 420*g*, 420*h*, 420*i*, 420*j*).

In some examples, the base station 702 may transmit the flush indicator configuration 710 in at least one of RRC signaling, a MAC-CE, or DCI. In some examples, the presence of the flush indicator and/or the length of the flush indicator may be based on an RRC configuration and/or an indication in a MAC-CE or DCI. For example, the RRC configuration may configure the presence of the flush indicator and/or the length of the flush indicator at the UE 704. The base station 702 may then transmit a MAC-CE or DCI to activate or deactivate the presence of the flush indicator and/or the length of the flush indicator.

In the illustrated example of FIG. 7, the UE 704 transmits an uplink transmission 720 that is received by the base station 702. In the illustrated example, the uplink transmission 720 includes at least one or more code blocks 722. The uplink transmission 720 may be a first (or initial) transmission of data (e.g., of the code block(s) 722) or may be a retransmission of data. In some examples, the data may include one or more code blocks (e.g., the code blocks 420*a*-420*j* of FIG. 4), which may be included in a transport block, such as the transport block 400 of FIG. 4. In some examples, the UE 704 may determine Aspects of the code block(s) 722 may be implemented by the code blocks 420*a*-420*j* of FIG. 4.

In some examples, the uplink transmission 720 may also include a flush indicator 724. Aspects of the flush indicator 724 may be implemented by the CBGFI 460 of FIG. 4. In some examples, the value of the flush indicator 724 may be set to a known value for each first (or initial) transmission. For example, if the uplink transmission 720 is an initial transmission of the code block(s) 722, the flush indicator 724 may be set to a value (e.g., a "1") to indicate to the base station 702 to flush out (or clear) the buffered data from prior transmissions. Thus, by setting the flush indicator 724 to a known value (e.g., a "1") for each first (or initial) transmission of a transport block, the base station 702 may be configured to discard (e.g., avoid combining) previously received data. In some examples, the base station 702 may perform combining of data associated with the instant transport block.

In some examples, the uplink transmission 720 may also include a CBGTI field 726. For example, when the uplink transmission 720 includes code block groups, the CBGTI field 726 may facilitate identifying which code block groups are included in the uplink transmission 720. Aspects of the CBGTI field 726 may be implemented by the CBGTI field 450 of FIG. 4. As described above, the length of the CBGTI field 726 may be based on the quantity of code block groups. For example, if the code blocks 722 are segmented into M code block groups, the length of the CBGTI field 726 may be M-bits. In such examples, each bit of the CBGTI field 726 may correspond to a respective code block group of the M code block groups. For example, referring to the illustrated example of FIG. 4, when the first bit of the CBGTI field 726 is set to a first value (e.g., a "1"), the base station 702 may determine that the uplink transmission 720 includes the first code block group 440a (e.g., including the first three code blocks 420a, 420b, 420c), and when the first bit of the CBGTI field 726 is set to a second value (e.g., a "0"), the base station 702 may determine that the uplink transmission 720 does not include the first code block group 440a. It may be appreciated that when the uplink transmission 720 is a first (or initial) transmission of the code block(s) 722, each bit of the CBGTI field 726 may be set to the first value (e.g., a "1") to indicate that the uplink transmission 720 includes each of the code block(s) 722.

In some examples, the length of the CBGTI field 726 may be M-bits and the length of the flush indicator 724 may be N-bits. Thus, it may be appreciated that with respect to the CBGTI field 726, the code block(s) 722 may be grouped into M code block groups. Similarly, with respect to the flush indicator 724, the code block(s) 722 may be grouped into N code block groups. In some examples, the grouping of code blocks related to the CBGTI field 726 may be the same as the grouping of code blocks related to the flush indicator 724 (e.g., N and M are the same value). In some examples, the grouping of code blocks related to the CBGTI field 726 may be different than the grouping of code blocks related to the flush indicator 724 (e.g., N and M are different values).

At 730, the base station 702 may process the code block(s) 722 of the uplink transmission 720. For example, the base station 702 may determine which, if any, of the code block(s) 722 include an error. In some examples, an error may occur due to an incomplete transmission. For example, the UE 702 may start transmitting the uplink transmission 720, but lose connection with the base station 702 before completing the transmission of the uplink transmission 720. In other examples, the UE 702 may start transmitting the uplink transmission 720 to the base station 702, but then start transmitting another transmission (e.g., start transmitting a sidelink transmission to a sidelink-capable device).

The base station 702 may also determine how to process any buffered data based on the uplink transmission 720. For example, if the uplink transmission 720 includes the flush indicator 724, the value of the flush indicator 724 may indicate to avoid combining (e.g., to not combine) the code block(s) 722 of the uplink transmission 720 with code blocks of prior transmissions (e.g., to flush data in a decoding buffer) or to combine the code block(s) 722 of the uplink transmission 720 with code blocks of prior transmissions that are buffered in the decoding buffer. It may be appreciated that in some examples, if the uplink transmission 720 is an initial transmission of the code block(s) 722, the flush indicator 724 may be set to a known value (e.g., a "1") to cause the base station 702 to avoid combining the code block(s) 722 of the uplink transmission 720 with code blocks of prior transmissions (e.g., to flush data in a decoding buffer). In some examples in which the uplink transmission 720 is an initial transmission, the base station 702 may, at 732, buffer the code blocks 722 in a buffer 706 of the base station 702. For example, the base station 702 may store the code blocks of the uplink transmission 720 as buffered code blocks 708 in the buffer 706. At 734, the base station 702 may combine the code blocks 722 with the corresponding buffered code blocks 708 or may flush out (e.g., clear or discard) the buffered code blocks 708 in the buffer 706 based on the flush indicator 724.

After processing the code blocks of the uplink transmission (e.g., at 730), the base station 702 transmits HARQ feedback 740 that is received by the UE 704. The HARQ feedback 740 may indicate to the UE 704 when an error is detected in the received uplink transmission 720 (e.g., by transmitting a NACK message to the UE 704) or when no error is detected in the received uplink transmission 720 (e.g., by transmitting an ACK message to the UE 704). In some examples, the base station 702 may detect an error due to an incomplete transmission. In some examples, the base station 702 may provide the HARQ feedback 740 at a transport block level. In other examples, the base station 702 may provide the HARQ feedback 740 at a code block level. In some examples, the base station 702 may provide the HARQ feedback 740 at a code block group level.

At 750, the UE 704 may determine which code blocks (if any) to retransmit to the base station 702 based on the received HARQ feedback 740. For example, based on negative feedback (e.g., a NACK message of the HARQ feedback 740), the UE 704 may determine to retransmit the entire transport block (e.g., all of the code block(s) 722), may determine to retransmit the code blocks linked with NACK messages, or may determine to retransmit the code block group(s) (and the corresponding code blocks) linked with NACK messages.

The UE 704 transmits an uplink retransmission 760 that is received by the base station 702. The uplink retransmission 760 includes at least one or more code block(s) 762 that the UE 704 determines to retransmit (e.g., at 750). For example, the uplink retransmission 760 may include all of the code block(s) 722 included in the transport block (e.g., when the HARQ feedback 740 is at the transport block level). In other examples, the uplink retransmission 760 may include the one or more code blocks linked with a NACK message (e.g., when the HARQ feedback 740 is at the code block level). In some examples, the uplink retransmission 760 may include the one or more code block groups linked with a NACK message (e.g., when the HARQ feedback 740 is at the code block group level).

In the illustrated example of FIG. 7, the uplink retransmission 760 also includes a flush indicator 764. Aspects of the flush indicator 764 may be implemented by the CBGFI 460 of FIG. 4. The flush indicator 764 is configured to indicate to the base station 702 how to process the code block(s) 762 received in the uplink retransmission 760. As described above, the flush indicator 764 may be set to a first value (e.g., a "1") to cause the base station 702 to flush out buffered code blocks (e.g., clear the data in a decoding buffer) or may be set to a second value (e.g., a "0") to cause the base station 702 to combine the received code block(s) 762 with buffered code blocks received from prior transmissions, such as the code block(s) 722 of the uplink transmission 720 of FIG. 7.

In some examples, the flush indicator 764 may be a single-bit field. In some such examples, the flush indicator 764 may be set to the first value (e.g., a "1") to cause the base station 702 to flush out all buffered code blocks (e.g., to not combine the code block(s) 762 of the uplink retransmission 760 with a prior transmission of the respective code blocks) or may be set to the second value (e.g., a "0") to cause the base station 702 to combine the code block(s) 762 of the uplink retransmission 760 with the buffered code blocks received from prior transmissions (e.g., data stored in the decoding buffer).

In some examples, the flush indicator 764 may be a multi-bit field. In some such examples, each bit of the flush indicator 764 may correspond to a respective code block of the code block(s) 762. For example, a first bit of the flush indicator 764 may correspond to a first code block (e.g., the first code block 420a). In some such examples, the first bit of the flush indicator 764 may be set to the first value (e.g., a "1") to cause the base station 702 to flush out the buffered code block corresponding to the first code block (e.g., to not combine the code block(s) 762 of the uplink retransmission 760 with a prior transmission of the respective code blocks) or may be set to the second value (e.g., a "0") to cause the base station 702 to combine the code block of the code block(s) 762 corresponding to the first code block with the buffered code blocks also corresponding to the first code block.

In some examples in which the flush indicator 764 is a multi-bit field, each bit of the flush indicator 764 may correspond to a respective code block group of the code block(s) 762. For example, a first bit of the flush indicator 764 may correspond to a first code block group (e.g., the first code block group 440a). In some such examples, the first bit of the flush indicator 764 may be set to the first value (e.g., a "1") to cause the base station 702 to flush out the buffered code blocks corresponding to the first code block group or may be set to the second value (e.g., a "0") to cause the base station 702 to combine the code blocks of the code blocks 762 corresponding to the first code block group with the buffered code blocks also corresponding to the first code block group. For example, and with respect to the illustrated example of FIG. 4, when the first bit of the flush indicator 764 is set to the first value (e.g., a "1"), the base station 702 may flush out the buffered code blocks corresponding to the first code block group 440a (e.g., the code blocks 420a, 420b, 420c), and when the first bit of the flush indicator 764 is set to the second value (e.g., a "0"), the base station 702 may combine the code block(s) 762 corresponding to the first code block group 440a with the buffered code blocks corresponding to the respective code blocks 420a, 420b, 420c.

In some examples, the uplink retransmission 760 may also include a CBGTI field 766. For example, when the uplink retransmission 760 includes code block groups, the CBGTI field 766 may facilitate identifying which code block groups are included in the uplink retransmission 760. Aspects of the CBGTI field 766 may similar to the CBGTI field 726.

At 770, the base station 702 may process the code block(s) 762 received in the uplink retransmission 760. For example, the base station 702 may determine which, if any, of the code block(s) 762 include an error. In some examples, the base station 702 may also determine how to process any buffered data based on the uplink retransmission 760 and the flush indicator 764. For example, the value of the flush indicator 764 may indicate to the base station 702 to not combine the one or more code block(s) 762 of the uplink retransmission 760 with code blocks of prior transmissions (e.g., to flush data in the decoding buffer). In such examples, at 772, the base station 702 may flush out the buffer 706. For example, the base station 702 may discard the buffered code block 708 of the buffer 706. In other examples, the value of the flush indicator 764 may indicate to the base station 702 to combine the one or more code block(s) 762 of the uplink retransmission 760 with code blocks of prior transmissions (e.g., one or more of the code block(s) 722 of the uplink transmission 720). In such examples, at 774, the base station 702 may combine the code blocks 762 with the buffered code blocks 708 of the buffer 706. The base station 702 may transmit a second HARQ feedback 780 based on the processing of the code block(s) 762 of the uplink retransmission 760 (e.g., at 770). Aspects of the second HARQ feedback 780 may be similar to the HARQ feedback 740.

In some examples, the UE 704 may transmit a flush indicator to the base station 702 after detecting an error in a prior transmission or an incomplete transmission. In some examples, an incomplete transmission may occur due to the UE 704 stopping the uplink transmission to the base station 702 to transmit another transmission (e.g., another uplink transmission to a base station or a sidelink transmission to a UE). The UE 704 may set one or more bits of the flush indicator 764 of the uplink retransmission 760 to the first value (e.g., a "1") after determining an error in a prior transmission of at least one code block (e.g., one of the code block(s) 722 of the uplink transmission 720). In some examples, the UE 704 may set one or more bits of the flush indicator 764 of the uplink retransmission 760 to the first value (e.g., a "1") after determining that a prior transmission (e.g., the uplink transmission 720) is an incomplete transmission.

In some examples, the UE 704 may transmit the flush indicator 724, 764 independent of the CBGTI field 726, 766 to the base station 702. In some examples, the UE 704 may transmit the flush indicator 724, 726 together with the CBGTI field 726, 766 to the base station 702.

Figure 8:
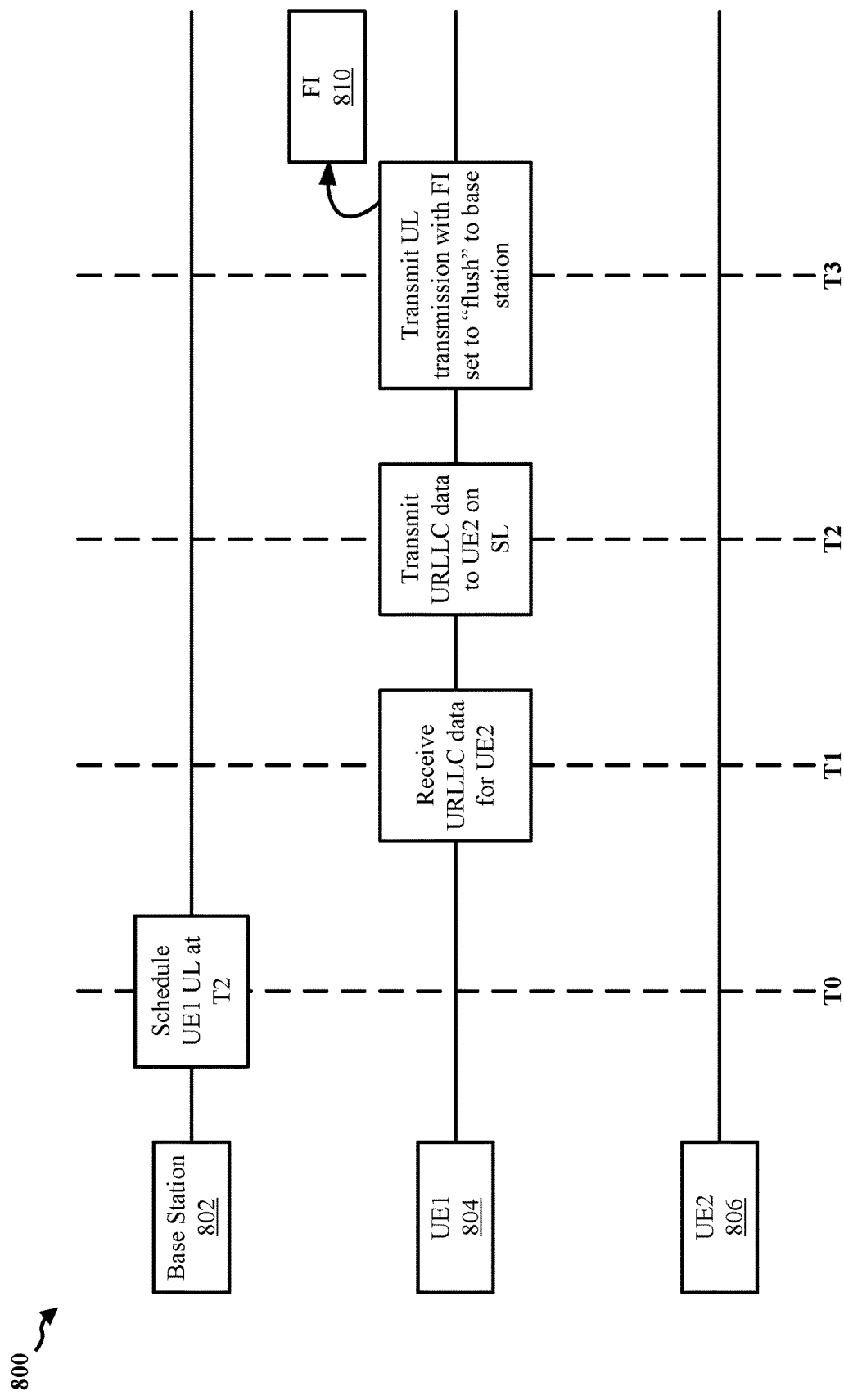
FIG. 8 illustrates an example timing diagram of a first UE in communication with a base station and a second UE, in accordance with one or more techniques disclosed herein.

FIG. 8 illustrates an example timing diagram 800 of a first UE 804 in communication with a base station 802 and a second UE 806, in accordance with one or more techniques disclosed herein. Aspects of the first UE 804 may be implemented by the UE 104, the second device 350, the first UE 604, and/or the UE 704. Aspects of the base station 802 may be implemented by the base station 102/180, the first device 310, the base station 602, and/or the base station 702. Aspects of the second UE 806 may be implemented by the UE 104, the first device 310, the second device 350, the second UE 606, and/or the third UE 608.

In the illustrated example of FIG. 8, the link between the first UE 804 and the base station 802 may be based on a Uu interface, such as the link 610 between the base station 602 and the first UE 604 of FIG. 6. The link between the first UE 804 and the second UE 806 may be based on a PC5 interface, such as the link 612 between the first UE 602 and the second UE 606 and the link 614 between the first UE 602 and the third UE 608 of FIG. 6.

At time T0, the base station 802 schedules the first UE 804 for an uplink transmission at time T2. For example, the base station 802 may schedule the first UE 804 to use a resource to transmit the uplink transmission at time T2. At time T1, the first UE 804 receives high priority data for the second UE 806. For example, the first UE 804 may receive ultra-reliable low latency communications (URLLC) data associated with immediate transmission to the second UE 806. At time T2, the first UE 804 transmits the high priority data (e.g., the URLLC data) to the second UE 806 on sidelink instead of transmitting the scheduled uplink transmission to the base station 802. That is, the first UE 804 may use the resource allocated to the first UE 804 to transmit the uplink transmission (e.g., at time T2) to transmit the high priority data (e.g., the URLLC date) to the second UE 806 on sidelink. In some examples, the first UE 804 and the second UE 806 may have previously agreed to allow the first UE 804 to transmit high priority data (e.g., the URLLC data) to the second UE 806 at the time T2. At time T3, the first UE 804 transmits an uplink transmission with a flush indicator 810 set to "flush" to the base station 802. For example, the first UE 804 may set one or more bits of the flush indicator 810 to a first value (e.g., a "1") to cause the base station 802 to avoid combining (e.g. to not combine) the code blocks of the uplink transmission with prior transmissions. In some examples, the first UE 804 may transmit the uplink transmission with the flush indicator 810 set to "flush" after determining that the resource allocated for the schedule uplink transmission was used to transmit the sidelink transmission to the second UE 806.

In some examples, as the first UE 804 did not transmit the scheduled uplink transmission to the base station 802 at the time T2, data buffered by the base station 802 in a decoding buffer may be invalid. Accordingly, the first UE 804 transmits, at time T3, the uplink transmission with the flush indicator 810 set to "flush" to indicate to the base station 802 to avoid combining (e.g. to not combine) the code blocks of the uplink transmission (e.g., at time T3) with a prior transmission of the code blocks (e.g., to flush or clear buffered data in its decoding buffer).

In some examples, the first UE 804 may receive the high priority data (e.g., the URLLC data) while the first UE 804 is transmitting an uplink transmission to the base station 802 at time T2. In some such examples, the first UE 804 may stop the uplink transmission to the base station 802 and start transmitting the high priority data (e.g., the URLLC data) to the second UE 806. As a result, the uplink transmission to the base station 802 (e.g., at time T2) may be incomplete. Accordingly, the first UE 804 transmits, at time T3, the uplink transmission with the flush indicator 810 set to "flush" to indicate to the base station 802 to not combine the code blocks of the uplink transmission (e.g., at time T3) with a prior transmission of the code blocks (e.g., to flush or clear buffered data in its decoding buffer).

Figure 9:
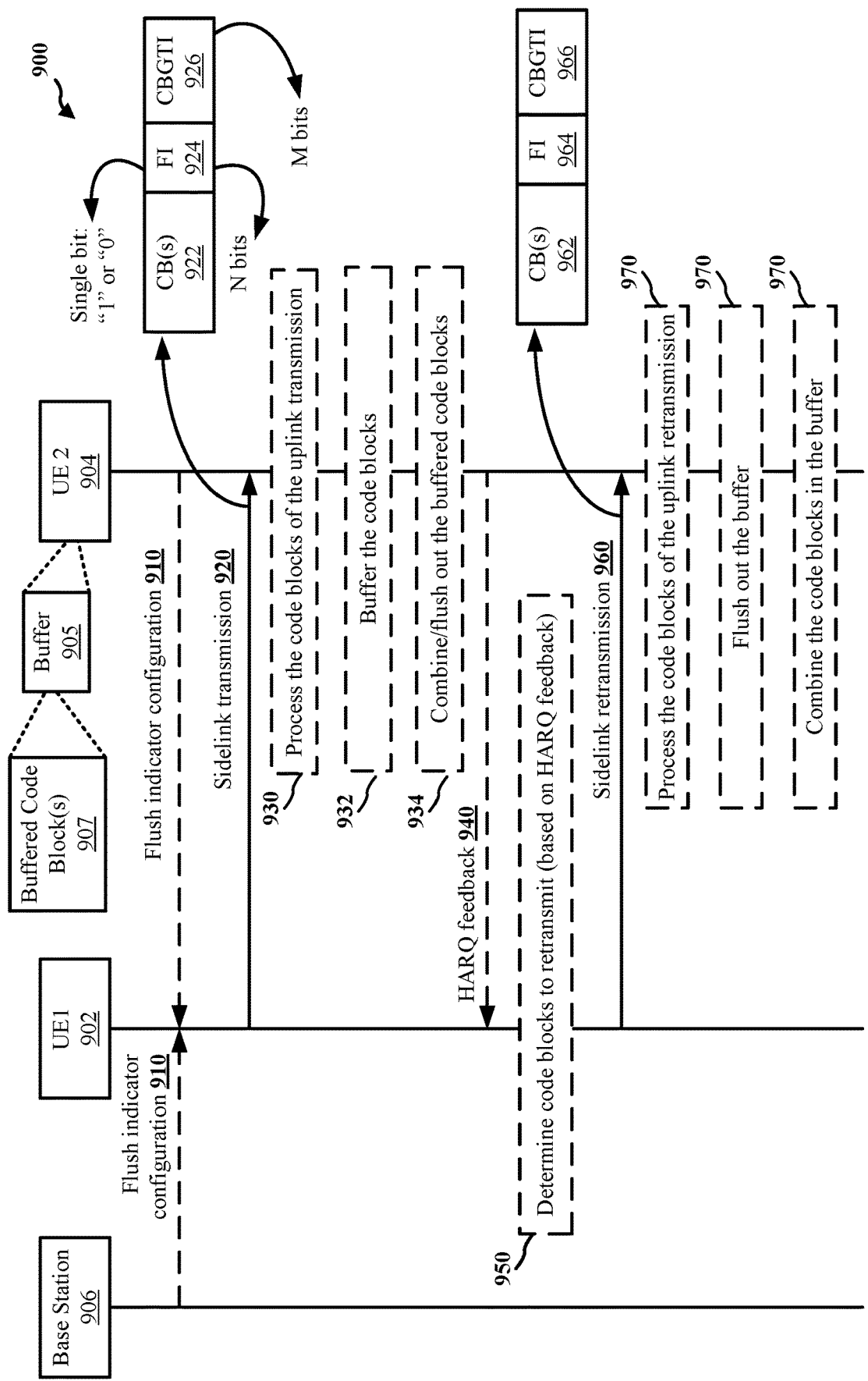
FIG. 9 is an example communication flow between a first UE, a second UE, and a base station, in accordance with one or more techniques disclosed herein.

FIG. 9 illustrates an example communication flow 900 between a first UE 902 and a second UE 904, in accordance with one or more techniques disclosed herein. Aspects of the first UE 902 may be implemented by the UE 104, the second device 350, the first UE 604, the UE 704, and/or the first UE 804. Aspects of the second UE 904 may be implemented by the UE 104, the first device 310, the second UE 606, the third UE 608, and/or the second UE 806. Aspects of the base station 906 may be implemented by the base station 102/180, the first device 310, the base station 602, the base station 702, and/or the base station 802.

In the illustrated example of FIG. 9, the first UE 902 is connected with the second UE 904 via sidelink, such as the PC5 interface (e.g., the links 612, 614) of FIG. 6. The first UE 902 may also be connected with the base station 906 via a Uu interface, such as the Uu interface (e.g. the link 610) of FIG. 6. Although not shown in the illustrated example of FIG. 9, it may be appreciated that in additional or alternative examples, the first UE 902 may be in communication with one or more other base stations or UEs, and/or the second UE 904 may be in communication with one or more other base stations or UEs. Thus, for example, in some examples, the first UE 902 may transmit a sidelink transmission to the second UE 904, and in other examples, the first UE 902 may transmit a transmission to the base station 906 that forwards the transmission to the second UE 904.

In the illustrated example of FIG. 9, the first UE 902 receives a flush indicator configuration 910. In some examples, the second UE 904 may transmit the flush indicator configuration 910 that is received by the first UE 902. In some examples, the base station 906 may transmit the flush indicator configuration 910 that is received by the first UE 902. Aspects of the flush indicator configuration 910 may be similar to the flush indicator configuration 710 of FIG. 7.

In some examples, the second UE 904 may transmit the flush indicator configuration 910 in SCI on PSCCH (e.g., the SCI 552 of FIG. 5B). In some examples, the base station 906 may transmit the flush indicator configuration 910 in a resource allocation mode 1 grant DCI.

As shown, the first UE 902 transmits a sidelink transmission 920 that is received by the second UE 904. In the illustrated example, the sidelink transmission 920 includes at least one or more code blocks 922. The sidelink transmission 920 may also include a flush indicator 924 and/or a CBGTI field 926. In some examples, the first UE 902 may transmit the flush indicator 924 independent of the CBGTI field 926 (e.g., a sidelink CBGTI) to the second UE. In some examples, the first UE 902 may transmit the flush indicator 924 together with the CBGTI field 926 (e.g. a sidelink CBGTI) to the second UE.

Aspects of the sidelink transmission 920 may be similar to the uplink transmission 720 of FIG. 7. Aspects of the code block(s) 922 may be similar to the code block(s) 722 of FIG. 7. Aspects of the flush indicator 924 may be similar to the flush indicator 724 of FIG. 7. Aspects of the CBGTI field 926 may be similar to the CBGTI field 726 of FIG. 7.

At 930, the second UE 904 may process the code block(s) 922 of the sidelink transmission 920. Aspects of processing the code block(s) 922 of the sidelink transmission 920 may be similar to the processing of the code block(s) 722 of the uplink transmission 720 of FIG. 7.

In some examples in which the sidelink transmission 920 is an initial transmission, the second UE 904 may, at 932, buffer the code blocks 922 in a buffer 905 of the second UE 904. For example, the second UE 904 may store the code blocks of the sidelink transmission 920 as buffered code blocks 907 in the buffer 905. At 934, the second UE 904 may combine the code blocks 922 with the corresponding buffered code blocks 907 or may flush out (e.g., clear or discard) the buffered code blocks 907 in the buffer 905 based on the flush indicator 924.

After processing the code blocks of the sidelink transmission (e.g., at 930), the second UE 904 may transmit HARQ feedback 940 that is received by the first UE 902. Aspects of the HARQ feedback 940 may be similar to the HARQ feedback 740 of FIG. 7. However, it may be appreciated that in some examples, devices in sidelink may not transmit HARQ feedback. For example, the first UE 902 may be capable of determining that a transmission is corrupted or incomplete and, thus, may determine to retransmit one or more code blocks regardless of whether the second UE transmits HARQ feedback.

At 950, the first UE 902 may determine which code blocks (if any) to retransmit to the second UE 904. In some examples, the first UE 902 may determine which code blocks to retransmit to the second UE 904 based on the received HARQ feedback 940. For example, based on negative feedback (e.g., a NACK message of the HARQ feedback 940), the first UE 902 may determine to retransmit the entire transport block (e.g., all of the code blocks 922). In other examples, the first UE 902 may determine to retransmit the code blocks linked with NACK messages. In some examples, the first UE 902 may determine to retransmit the code block group(s) (and the corresponding code blocks) linked with NACK messages.

In some examples, the first UE 902 may determine which code blocks to retransmit based on a determination that the sidelink transmission 920 is corrupted or incomplete. For example, the first UE 902 may detect an error in one or more of the code block(s) 922 and may determine to retransmit the corresponding code blocks. In other examples, the first UE 902 may start transmitting the sidelink transmission 920, but stop the transmission before the transmission completes. For example, and with respect to the illustrated example of FIG.

4, the first UE 902 may transmit the code blocks 420a, 420b, 420c of the first code block group 440a, but may be unable to complete the transmission of the code blocks 420d-420j of the second code block group 440b and the third code block group 440c. In some examples, the first UE 902 may be unable to complete the transmission due to an error in the connection with the second UE 904. In some examples, the first UE 902 may be unable to complete the transmission due to a request to transmit a higher priority transmission, such as the URLLC data of FIG. 8.

The first UE 902 transmits a sidelink retransmission 960 that is received by the second UE 904. The sidelink retransmission 960 includes one or more code blocks 962 and a flush indicator 964. In some examples, the sidelink retransmission 960 may also include a CBGTI field 966. Aspects of the sidelink retransmission 960 may be similar to the uplink retransmission 760 of FIG. 7. Aspects of the code block(s) 962 may be similar to the code block(s) 762 of FIG. 7. Aspects of the flush indicator 964 may be similar to the flush indicator 764 of FIG. 7. Aspects of the CBGTI field 966 may be similar to the CBGTI field 766 of FIG. 7.

At 970, the second UE 904 may process the code block(s) 962 received in the sidelink retransmission 960. For example, the second UE 904 may determine which, if any, of the code block(s) 962 include an error. In some examples, the second UE 904 may also determine how to process any buffered data based on the sidelink retransmission 960 and the flush indicator 964. For example, the value of the flush indicator 964 may indicate to the second UE 904 to avoid combining (e.g., to not combine) the one or more code blocks 962 of the sidelink retransmission 960 with code blocks of prior transmissions (e.g., to flush data in the decoding buffer). In such examples, at 972, the second UE 904 may flush out the buffer 905. For example, the second UE 904 may discard the buffered code block 907 of the buffer 905. In other examples, the value of the flush indicator 964 may indicate to the second UE 904 to combine the one or more code blocks 962 of the sidelink retransmission 960 with code blocks of prior transmissions (e.g., one or more of the code blocks 922 of the sidelink transmission 920). In such examples, at 974, the second UE 904 may combine the code blocks 962 with the buffered code blocks 907 of the buffer 905. Although not shown in the illustrated example of FIG. 9, it may be appreciated that the second UE 904 may transmit another HARQ feedback based on the processing of the code block(s) 962 of the sidelink retransmission 960 (e.g., at 970).

In some examples, the first UE 902 may transmit a flush indicator to the second UE 904 after detecting an error in a prior transmission or an incomplete transmission. For example, the first UE 902 may set one or more bits of the flush indicator 964 of the sidelink retransmission 960 to the first value (e.g., a "1") after determining an error in a prior transmission of at least one code block (e.g., one of the code blocks 922 of the sidelink transmission 920). In some examples, the first UE 902 may set one or more bits of the flush indicator 964 of the sidelink retransmission 960 to the first value (e.g., a "1") after determining that a prior transmission (e.g., the sidelink transmission 920) was an incomplete transmission.

In some examples, the first UE 902 may be configured to relay communication between the second UE 904 and the base station 906. In some such examples, the first UE 902 may transmit the flush indicator 924, 964 independent of a Uu CBGTI. In other examples, the first UE 902 may transmit the flush indicator 924, 926 in connection with at least one of a Uu CBGTI or a Uu flush indicator.

Figure 10:
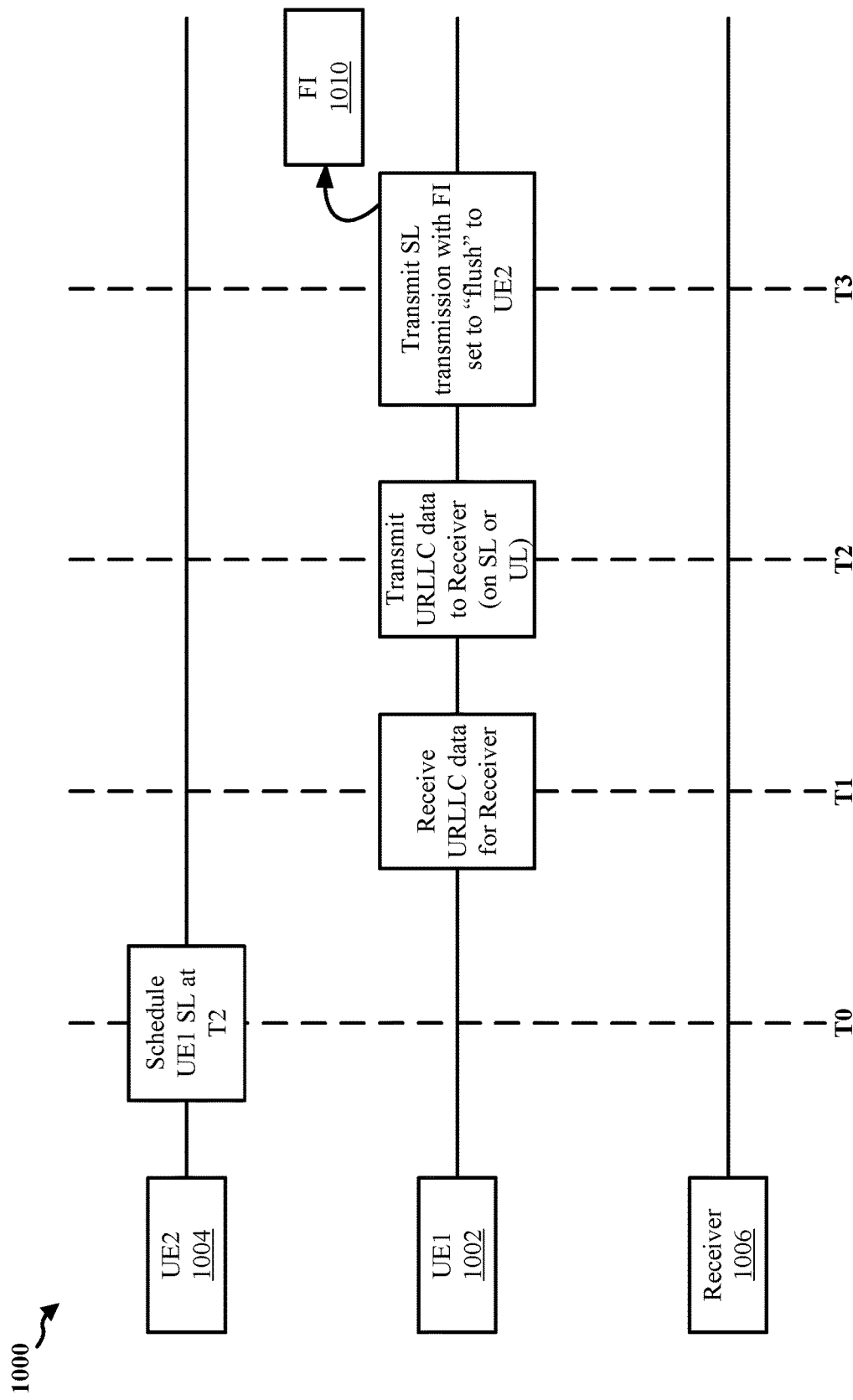
FIG. 10 illustrates an example timing diagram of a first UE in communication with a second UE and a receiver, in accordance with one or more techniques disclosed herein.

FIG. 10 illustrates an example timing diagram 1000 of a first UE 1002 in communication with a second UE 1004 and a receiver 1006, in accordance with one or more techniques disclosed herein. Aspects of the first UE 1002 may be implemented by the UE 104, the second device 350, the first UE 604, the UE 704, the first UE 804, and/or the first UE 902. Aspects of the second UE 1004 may be implemented by the UE 104, the first device 310, the second device 350, the second UE 606, the third UE 608, the second UE 806, and/or the second UE 904. Aspects of the receiver may be implemented by a base station (e.g., the base station 102/180, the first device 310, the base station 602, the base station 702, the base station 802, and/or the base station 906) or a sidelink receiver (e.g., the UE 104, the first device 310, the second device 350, the second UE 606, the third UE 608, the second UE 806, and/or the second UE 904).

In the illustrated example of FIG. 10, the link between the first UE 1002 and the second UE 1004 may be based on a PC5 interface, such as the links 612, 614 between the first UE 604 and the second UE 606 and/or the third UE 608, respectively, of FIG. 6. The link between the first UE 1002 and the receiver 1006 may be based on a Uu interface, such as the link 610 between the base station 602 and the first UE 604 of FIG. 6, or a PC5 interface, such as the links 612, 614 between the first UE 602 and the second UE 606 and/or the third UE 608, respectively, of FIG. 6.

At time T0, the second UE 1004 schedules the first UE 1002 for a sidelink transmission at time T2. At time T1, the first UE 1002 receives high priority data for the receiver 1006. For example, the first UE 1002 may receive ultra-reliable low latency communications (URLLC) data associated with immediate transmission to the receiver 1006. At time T2, the first UE 1002 transmits the high priority data (e.g., the URLLC data) to the receiver 1006 instead of transmitting the scheduled sidelink transmission to the second UE 1004. The first UE 1002 may transmit the high priority data (e.g., the URLLC data) to the receiver 1006 on sidelink (e.g., when the receiver 1006 is another UE) or on uplink (e.g., when the receiver 1006 is a base station). It may be appreciated that the first UE 1002 and the receiver 1006 may have previously agreed to allow the first UE 1002 to transmit high priority data (e.g., the URLLC data) to the receiver 1006 at the time T2. At time T3, the first UE 1002 transmits a sidelink transmission with a flush indicator 1010 set to "flush" to the second UE 1004. For example, the first UE 1002 may set one or more bits of the flush indicator 1010 to a first value (e.g., a "1") to cause the second UE 1004 to avoid combining (e.g., to not combine) the code blocks of the sidelink transmission with prior transmissions.

In some examples, as the first UE 1002 did not transmit the scheduled sidelink transmission to the second UE 1004 at the time T2, data buffered by the second UE 1004 in a decoding buffer may be invalid. Accordingly, the first UE 1002 transmits, at time T3, the sidelink transmission with the flush indicator 1010 set to "flush" to indicate to the second UE 1004 to avoid combining (e.g., to not combine) the code blocks of the sidelink transmission (e.g., at time T3) with a prior transmission of the code blocks (e.g., to flush or clear buffered data in its decoding buffer).

In some examples, the first UE 1002 may receive the high priority data (e.g., the URLLC data) while the first UE 1002 is transmitting a sidelink transmission to the second UE 1004 at time T2. In some such examples, the first UE 1002 may stop the sidelink transmission to the second UE 1004 and start transmitting the high priority data (e.g., the URLLC data) to the receiver 1006. As a result, the sidelink transmission to the second UE 1004 (e.g., at time T2) may be incomplete. Accordingly, the first UE 1002 transmits, at time T3, the sidelink transmission with the flush indicator 1010 set to "flush" to indicate to the second UE 1004 to not combine the code blocks of the sidelink transmission (e.g., at time T3) with a prior transmission of the code blocks (e.g., to flush or clear buffered data in its decoding buffer).

Figure 11:
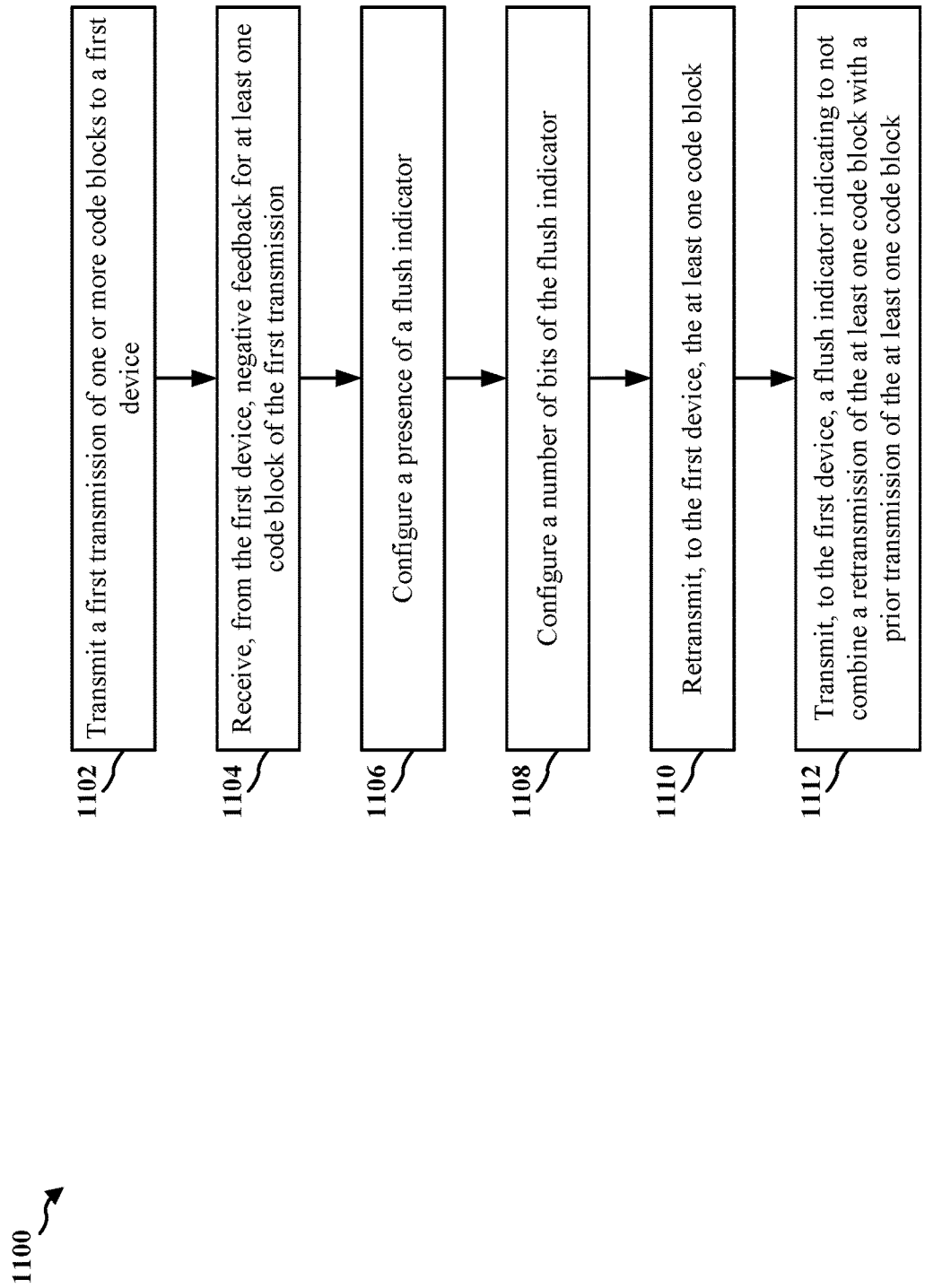
FIG. 11 is a flowchart of a method of wireless communication at an apparatus, in accordance with the teachings disclosed herein.

FIG. 11 is a flowchart 1100 of a method of wireless communication at an apparatus. In some examples, the apparatus may be a UE (e.g., the UE 104, the second device 350, and/or an apparatus 1402 of FIG. 14). The apparatus may transmit to a base station (e.g., using a Uu interface). The apparatus may transmit to another UE (e.g., using sidelink). The method may enable a UE to help improve decoding of packets at a receiver, such as a base station or another UE.

At 1102, the apparatus transmits a first transmission of one or more code blocks to a first device, as described in connection with the uplink transmission 720 of FIG. 7 and/or the sidelink transmission 920 of FIG. 9. For example, 1102 may be performed by a first transmission component 1440 of the apparatus 1402 of FIG. 14. In some examples, the first device may be a base station and the first transmission may be an uplink transmission, as described above in connection with the example uplink transmission 720 including the code block(s) 722 of FIG. 7. In some examples, the first device may be another UE and the first transmission may be a sidelink transmission, as described above in connection with the example sidelink transmission 920 including the code block(s) 922 of FIG. 9.

At 1104, the apparatus receives, from the first device, negative feedback for at least one code block of the first transmission, as described in connection with the HARQ feedback 740 of FIG. 7 and/or the HARQ feedback 940 of FIG. 9. For example, 1104 may be performed by feedback component 1442 of the apparatus 1402 of FIG. 14. The negative feedback may include HARQ NACK feedback.

At 1106, the apparatus may configure a presence of a flush indicator, as described above in connection with the flush indicator configuration 710 of FIG. 7 and/or the flush indicator configuration 910 of FIG. 9. For example, 1106 may be performed by a flush indicator configuration component 1444 of the apparatus 1402 of FIG. 14. In some examples, the presence of the flush indicator may be based on configuration information (e.g., the flush indicator configuration 710, 910) from at least one of a base station, another UE, or the UE as a sidelink transmitter. For example, the presence of the flush indicator may be indicated in a resource allocation mode 1 grant DCI or in SCI on PSCCH.

At 1108, the apparatus may configure a number of bits of a flush indicator, as described above in connection with the flush indicator configuration 710 of FIG. 7 and/or the flush indicator configuration 910 of FIG. 9. For example, 1108 may be performed by a flush indicator configuration component 1444 of the apparatus 1402 of FIG. 14. In some examples, the number of bits of the flush indicator may be based on configuration information (e.g., the flush indicator configuration 710, 910) from at least one of a base station, another UE, or the UE as a sidelink transmitter. For example, the number of bits of the flush indicator may be indicated in a resource allocation mode 1 grant DCI or in SCI on PSCCH.

At 1110, the apparatus retransmits, to the first device, the at least one code block, as described in connection with the uplink retransmission 760 of FIG. 7 and/or the sidelink retransmission 960 of FIG. 9. For example, 1110 may be performed by a retransmission component 1448 of the apparatus 1402 of FIG. 14. For example, when the first device is a base station, the apparatus may retransmit the at least one code block in an uplink retransmission, as described above in connection with the example uplink retransmission 760 including the code block(s) 762 of FIG. 7. In some examples, the first device may be another UE and the apparatus may retransmit the at least one code block in a sidelink retransmission, as described above in connection with the example sidelink retransmission 960 including the code block(s) 962 of FIG. 9.

At 1112, the apparatus transmits, to the first device, a flush indicator indicating to not combine a retransmission of the at least one code block with a prior transmission of the at least one code block, as described in connection with the flush indicator 810 of FIG. 8 and/or the flush indicator 1010 of FIG. 10. For example, 1112 may be performed by a flush indicator component 1446 of the apparatus 1402 of FIG. 14. For example, when the first device is a base station, the apparatus may transmit the flush indicators, as described above in connection with the flush indicators 724, 764 of FIG. 7, and/or the flush indicator 810 transmitted at time T3 of FIG. 8. For example, the apparatus may transmit the flush indicator in an uplink transmission, as described above in connection with the uplink transmission 720 including the flush indicator 724, and/or in an uplink retransmission, as described above in connection with the uplink retransmission 760 including the flush indicator 764. In some examples, the apparatus transmits the flush indicator independent of a CBGTI to the base station. In some examples, the apparatus transmits the flush indicator in connection with the CBGTI to the base station. In some examples, the apparatus determines an error in the prior transmission of the at least one code block, as described above in connection with 750 of FIG. 7, and the flush indicator indicates to the base station to flush the prior transmission of the at least one code block, as described above in connection with the flush indicators 724, 764 of FIG. 7 and/or the transmitting of the flush indicator 810 at time T3 of FIG. 8. In some examples, the error in the prior transmission may be based on an incomplete transmission of the first transmission, as described above in connection with time T2 of FIG. 8.

In some examples, the first device is another UE and the apparatus may transmit the flush indicators, as described above in connection with the flush indicators 924, 964 of FIG. 9, and/or the flush indicator 1010 transmitted at time T3 of FIG. 10. For example, the apparatus may transmit the flush indicator in a sidelink transmission, as described above in connection with the sidelink transmission 920 including the flush indicator 924, and/or in a sidelink retransmission, as described above in connection with the sidelink retransmission 960 including the flush indicator 964. In some examples, the apparatus determines an error in the prior transmission of the at least one code block, as described above in connection with 950 of FIG. 9, and the flush indicator indicates to the other UE to flush the prior transmission of the at least one code block, as described above in connection with the flush indicators 924, 964 of FIG. 9 and/or the transmitting of the flush indicator 1010 at time T3 of FIG. 10. In some examples, the error in the prior transmission may be based on an incomplete transmission of the first transmission, as described above in connection with time T2 of FIG. 10. In some examples, the apparatus transmits the flush indicator independent of a sidelink CBGTI to the other UE. In some examples, the apparatus transmits the flush indicator in connection with the sidelink CBGTI to the other UE. In some examples, the apparatus relays communication between a base station and the other UE. In some such examples, the apparatus may transmit the flush indicator independent of a Uu CBGTI to the other UE. In other examples, the apparatus may transmit the flush indicator in connection with at least one of a Uu CBGTI or a Uu FI to the other UE.

Figure 12:
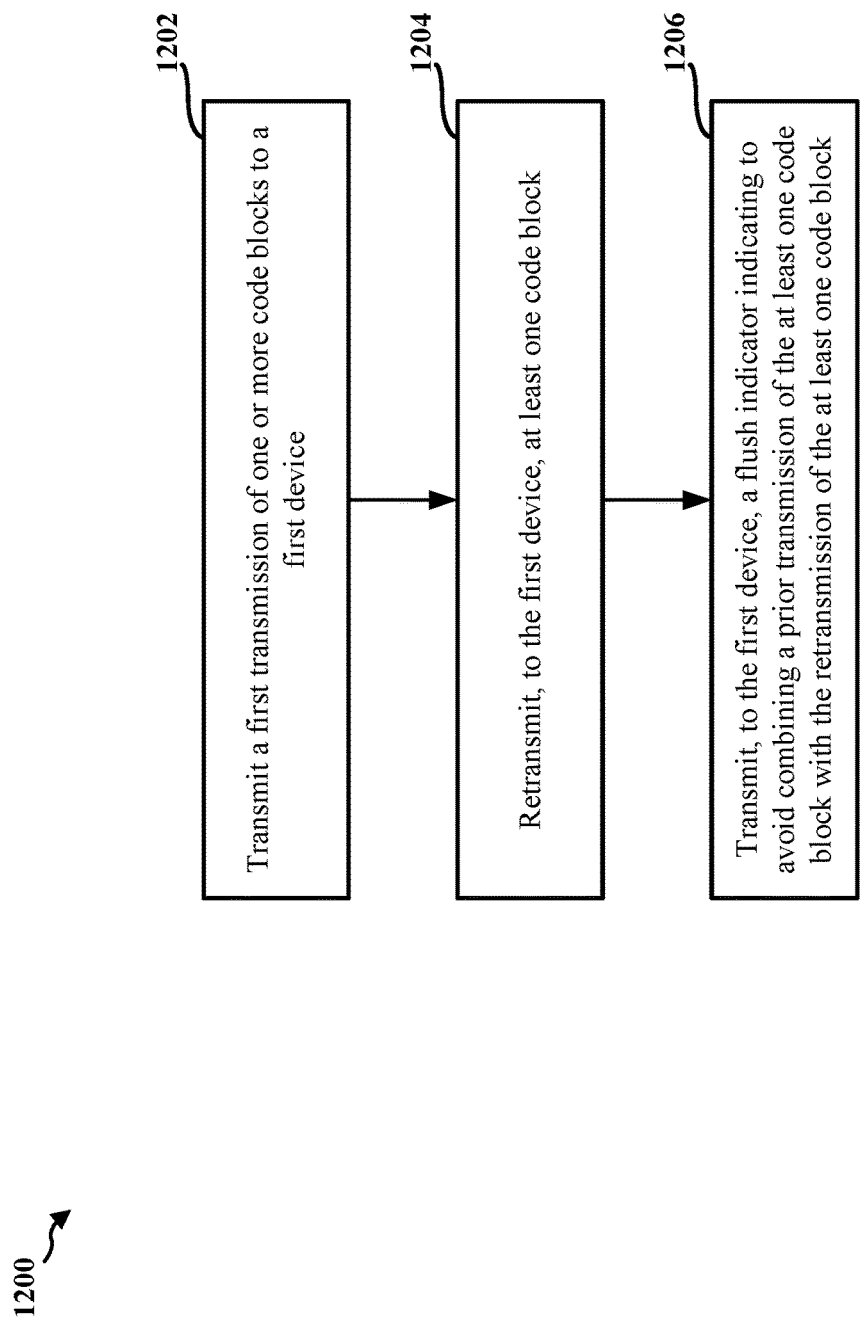
FIG. 12 is a flowchart of a method of wireless communication at a UE, in accordance with the teachings disclosed herein.

FIG. 12 is a flowchart 1200 of a method of wireless communication. The method may be performed by a UE (e.g., the UE 104, the second device 350, and/or an apparatus 1402 of FIG. 14). The apparatus may transmit to a base station (e.g., using a Uu interface). The apparatus may transmit to another UE (e.g., using sidelink). The method may enable a UE to help improve decoding of packets at a receiver, such as a base station or another UE.

At 1202, the UE transmits a first transmission of one or more CBs to a first device, as described in connection with the uplink transmission 720 of FIG. 7 and/or the sidelink transmission 920 of FIG. 9. For example, 1202 may be performed by a first transmission component 1440 of the apparatus 1402 of FIG. 14.

At 1204, the UE retransmits, to the first device, at least one CB of the one or more CBs, as described in connection with the uplink retransmission 760 of FIG. 7 and/or the sidelink retransmission 960 of FIG. 9. For example, 1204 may be performed by a retransmission component 1448 of the apparatus 1402 of FIG. 14.

At 1206, the UE transmits, to the first device, a flush indicator indicating to avoid combining a prior transmission of the at least one CB with the retransmission of the at least one CB, as described in connection with the flush indicator 810 of FIG. 8 and/or the flush indicator 1010 of FIG. 10. For example, 1206 may be performed by a flush indicator component 1446 of the apparatus 1402 of FIG. 14.

In some examples, the first device is a second UE. In such examples, the UE may transmit the flush indicator (e.g., at 1206) in a sidelink transmission to the second UE.

In some examples, the first device is a base station. In such examples, the UE may transmit the flush indicator (e.g., at 1206) in an uplink transmission to the base station.

Figure 13:
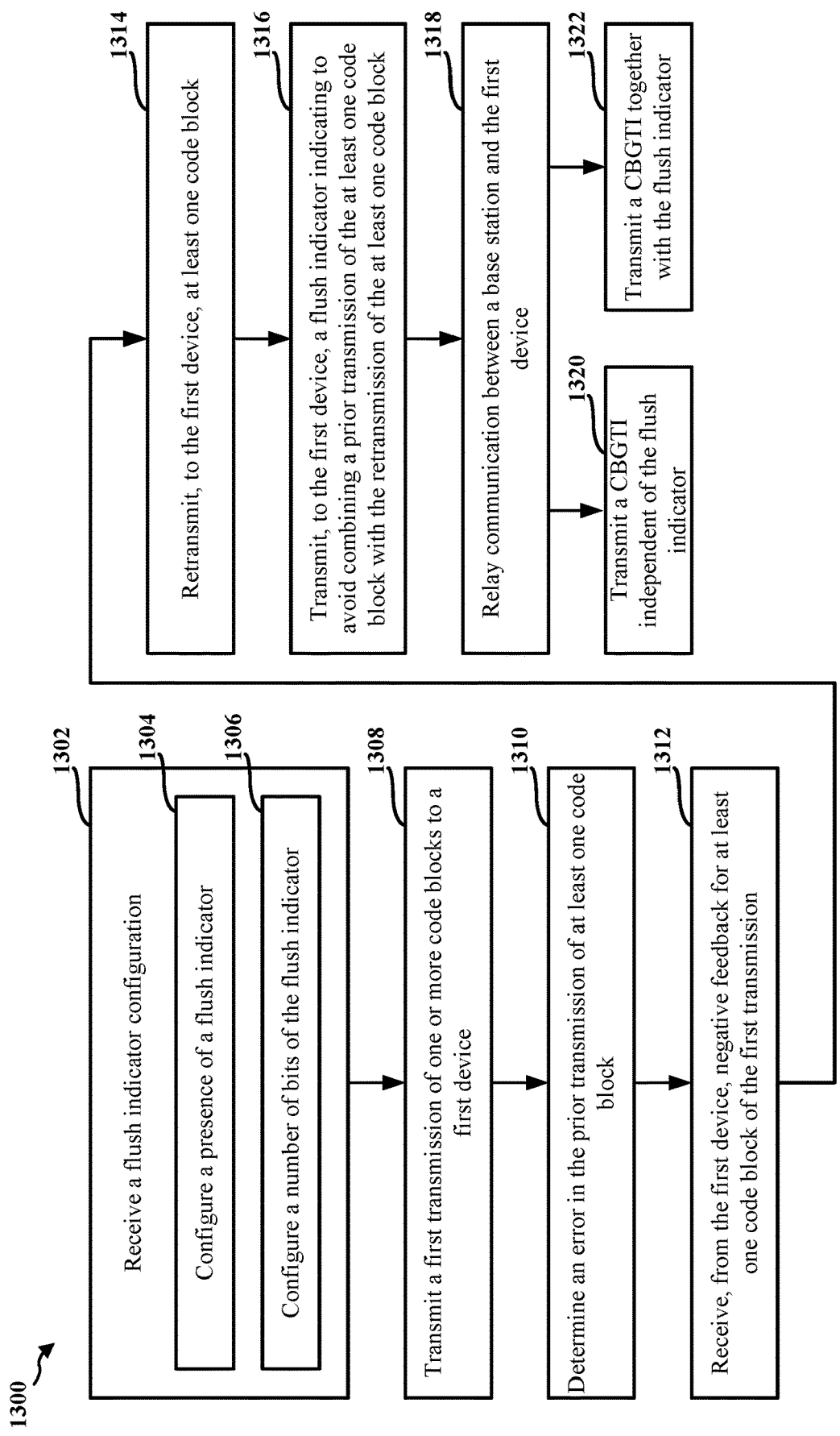
FIG. 13 is a flowchart of a method of wireless communication at a UE, in accordance with the teachings disclosed herein.

FIG. 13 is a flowchart 1300 of a method of wireless communication. The method may be performed by a UE (e.g., the UE 104, the second device 350, and/or an apparatus 1402 of FIG. 14). The apparatus may transmit to a base station (e.g., using a Uu interface). The apparatus may transmit to another UE (e.g., using sidelink). The method may enable a UE to help improve decoding of packets at a receiver, such as a base station or another UE.

At 1308, the UE transmits a first transmission of one or more CBs to a first device, as described in connection with the uplink transmission 720 of FIG. 7 and/or the sidelink transmission 920 of FIG. 9. For example, 1308 may be performed by a first transmission component 1440 of the apparatus 1402 of FIG. 14.

At 1314, the UE retransmits, to the first device, at least one CB of the one or more CBs, as described in connection with the uplink retransmission 760 of FIG. 7 and/or the sidelink retransmission 960 of FIG. 9. For example, 1314 may be performed by a retransmission component 1448 of the apparatus 1402 of FIG. 14.

At 1316, the UE transmits, to the first device, a flush indicator indicating to avoid combining a prior transmission of the at least one CB with the retransmission of the at least one CB, as described in connection with the flush indicator 810 of FIG. 8 and/or the flush indicator 1010 of FIG. 10. For example, 1316 may be performed by a flush indicator component 1446 of the apparatus 1402 of FIG. 14.

In some examples, the first device is a second UE. In such examples, the UE may transmit the flush indicator (e.g., at 1316) in a sidelink transmission to the second UE.

In some examples, the UE may retransmit the at least one CB to the second UE based on an error detected in connection with the first transmission. For example, at 1310, the UE may determine an error in the prior transmission of the at least one CB based on an incomplete transmission of the first transmission, as described in connection with 950 of FIG. 9. For example, 1310 may be performed by an error detection component 1450 of the apparatus 1402 of FIG. 14. In such examples, the UE may transmit, at 1316, the flush indicator to indicate to the second UE to flush the prior transmission of the at least one CB.

In some examples, the UE may transmit CBGTI to the second UE, as described in connection with the CBGTI field 926, 966 of FIG. 9. For example, at 1320, the UE may transmit the flush indicator independent of a sidelink CBGTI to the second UE. In other examples, the UE may transmit, at 1322, the flush indicator together with a sidelink CBGTI to the second UE. The transmitting of the CBGTI (e.g., at 1320 or 1322) may be performed by a CBGTI component 1452 of the apparatus 1402 of FIG. 14.

In some examples, the UE may be a relay between a base station and the second UE. For example, at 1318, the UE may relay communication between the base station and the second UE, as described in connection with the base station 602, the first UE 604, and the second UE 606 of FIG. 6. For example, 1318 may be performed by a relay component 1454 of the apparatus 1402 of FIG. 14.

In some such examples, the UE may transmit (e.g., at 1320) the flush indicator independent of a Uu CBGTI. In other examples, the UE may transmit (e.g., at 1322) the flush indicator in connection with at least one of a Uu CBGTI or a Uu flush indicator.

In some examples, the flush indicator may be configured with a presence and/or a length. For example, at 1302, the UE may receive a flush indicator configuration, as described in connection with the flush indicator configuration 710 of FIG. 7 and/or the flush indicator configuration 910 of FIG. 9. For example, 1302 may be performed by a flush indicator configuration component 1444 of the apparatus 1402 of FIG. 14.

The UE may use the flush indicator configuration to configure a presence of a flush indicator and/or configure a number of bits of the flush indicator. For example, at 1304, the UE may configure a presence of the flush indicator. For example, 1304 may be performed by the flush indicator configuration component 1444 of the apparatus 1402 of FIG. 14. The UE may configure the presence of the flush indicator based on configuration information from at least one of a base station, the second UE, or the UE as a sidelink transmitter. In other examples, the UE may configure the presence of the flush indicator based on sidelink control information on a physical sidelink control channel.

At 1306, the UE may configure a number of bits of the flush indicator. For example, 1306 may be performed by the flush indicator configuration component 1444 of the apparatus 1402 of FIG. 14. The UE may configure the number of bits of the flush indicator based on configuration information from at least one of a base station, the second UE, or the UE as a sidelink transmitter. In other examples, the UE may configure the number of bits of the flush indicator based on sidelink control information on a physical sidelink control channel.

In some examples, the first device is a base station. In such examples, the UE may transmit the flush indicator (e.g., at 1316) in an uplink transmission to the base station.

In some examples, the UE may retransmit the at least one CB to the base station based on an error detected in connection with the first transmission. For example, at 1310, the UE may determine an error in the prior transmission based on determining that a resource associated with the prior transmission was used to transmit to a sidelink UE in the prior transmission of the at least one CB. For example, 1310 may be performed by an error detection component 1450 of the apparatus 1402 of FIG. 14. For example, and with respect to the example of FIG. 8, the UE may use the resource allocated to transmit the uplink transmission (e.g., at time T2) to transmit the high priority data (e.g., the URLLC date) to the second UE 806 on sidelink. In such examples, the UE may transmit, at 1316, the flush indicator to indicate to the base station to flush the prior transmission of the at least one CB.

In some examples, the UE may retransmit the at least one CB to the base station based on negative feedback. For example, at 1312, the UE may receive, from the first device (e.g., the base station), negative feedback for the at least one code block of the first transmission, as described in connection with the HARQ feedback 740 of FIG. 7. For example, 1312 may be performed by a feedback component 1442 of the apparatus 1402 of FIG. 14.

In some examples, the UE may transmit CBGTI to the base station, as described in connection with the CBGTI field 726, 766 of FIG. 7. For example, at 1320, the UE may transmit the flush indicator independent of a CBGTI to the base station. In other examples, the UE may transmit, at 1322, the flush indicator together with a CBGTI to the base station. The transmitting of the CBGTI (e.g., at 1320 or 1322) may be performed by a CBGTI component 1452 of the apparatus 1402 of FIG. 14.

Figure 14:
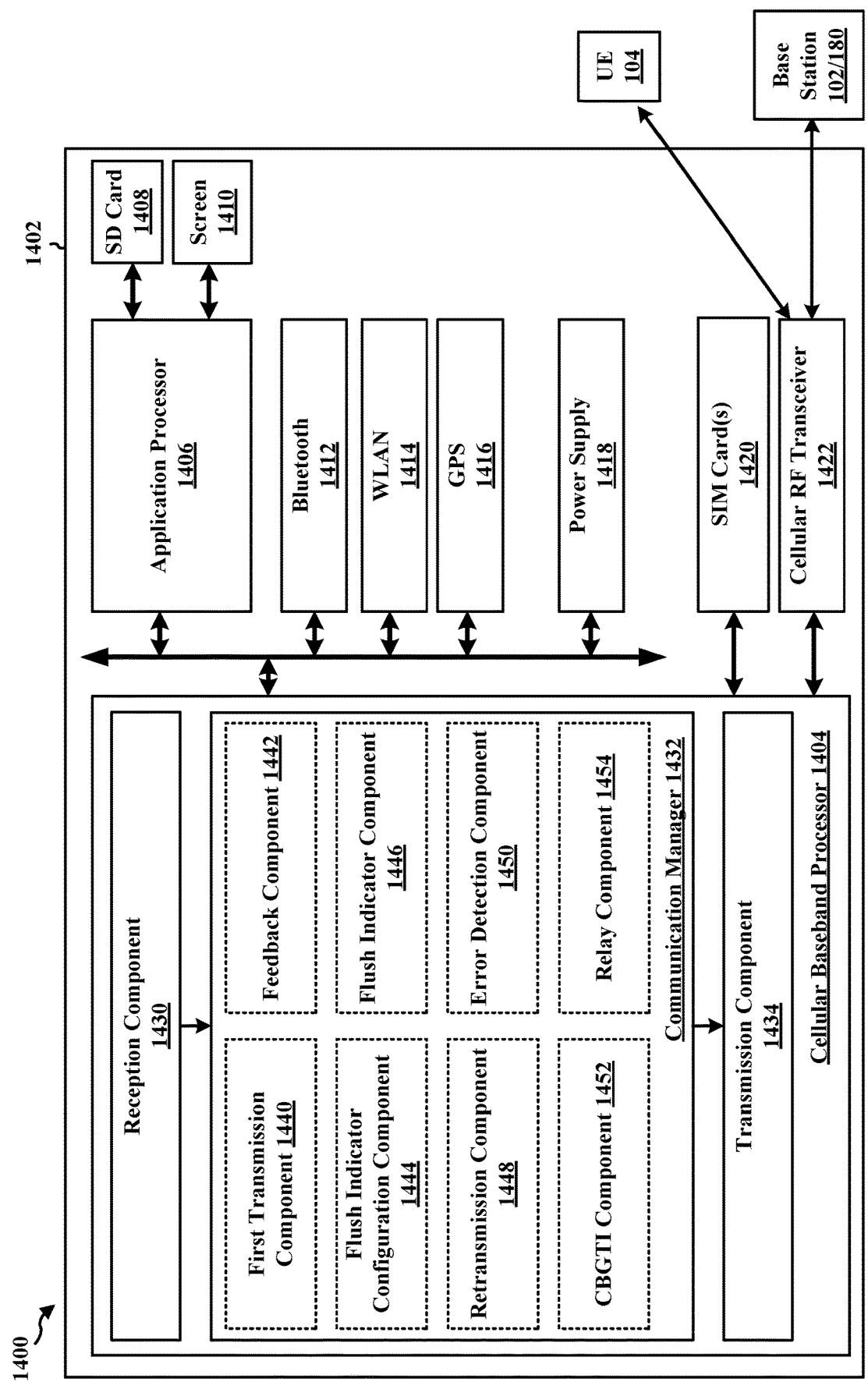
FIG. 14 is a diagram illustrating an example of a hardware implementation for an example apparatus, in accordance with the teachings disclosed herein.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The cellular baseband processor 1404 communicates through the cellular RF transceiver 1422 with the UE 104 and/or base station 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the second device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see the second device 350 of FIG. 3) and include the additional modules of the apparatus 1402.

The communication manager 1432 includes a first transmission component 1440 that is configured to transmit a first transmission of one or more code blocks to a first device, for example, as described in connection with 1102 of FIG. 11. The example first transmission component 1440 may also be configured to transmit a first transmission of one or more code blocks to a first device, for example, as described in connection with 1202 of FIG. 12 and/or 1308 of FIG. 13.

The communication manager 1432 also includes a feedback component 1442 that is configured to receive, from the first device, negative feedback for at least one code block of the first transmission, for example, as described in connection with 1104 of FIG. 11. The example feedback component 1442 may also be configured to receive, from the first device, negative feedback for at least one code block of the first transmission, for example, as described in connection with 1312 of FIG. 13.

The communication manager 1432 also includes a flush indicator configuration component 1444 that is configured to configure a presence of a flush indicator, for example, as described in connection with 1106 of FIG. 11. The example flush indicator configuration component 1444 may also be configured to configure a number of bits of a flush indicator, for example, as described in connection with 1108 of FIG. 11. The example flush indicator configuration component 1444 may also be configured to receive a flush indicator configuration, for example, as described in connection with 1302 of FIG. 13. The example flush indicator configuration component 1444 may also be configured to configure a presence of a flush indicator, for example, as described in connection with 1304 of FIG. 13. The example flush indicator configuration component 1444 may also be configured to configure a number of bits of a flush indicator, for example, as described in connection with 1306 of FIG. 13.

The communication manager 1432 also includes a flush indicator component 1446 that is configured to transmit, to the first device, a flush indicator indicating to not combine a retransmission of the at least one code block with a prior transmission of the at least one code block, for example, as described in connection with 1112 of FIG. 11. The example flush indicator component 1446 may also be configured to transmit, to the first device, a flush indicator indicating to avoid combining a prior transmission of the at least one code block with the retransmission of the at least one code block, for example, as described in connection with 1206 of FIG. 12 and/or 1316 of FIG. 13.

The communication manager 1432 also includes a retransmission component 1448 that is configured to retransmit, to the first device, the at least one code block, for example, as described in connection with 1110 of FIG. 11. The example retransmission component 1448 may also be configured to retransmit, to the first device, at least one code block, for example, as described in connection with 1204 of FIG. 12 and/or 1314 of FIG. 13.

The communication manager 1432 also includes an error detection component 1450 that is configured to determine an error in the prior transmission of the at least one code block, for example, as described in connection with 1310 of FIG. 13.

The communication manager 1432 also includes a CBGTI component 1452 that is configured to transmit the FI independent of a sidelink CBGTI to the second UE, to transmit the FI independent of a Uu CBGTI, and/to transmit the FI independent of a CBGTI to the base station, for example, as described in connection with 1320 of FIG. 13. The CBGTI component 1452 may also be configured to transmit the FI together with a sidelink CBGTI to the second UE, to transmit the FI in connection with at least one of a Uu CBGTI or a Uu FI, and/or to transmit the FI in connection with a CBGTI, for example, as described in connection with 1322 of FIG. 13.

The communication manager 1432 also includes a relay component 1454 that is configured to relay communication between a base station and the first device, for example, as described in connection with 1318 of FIG. 13.

The apparatus may include additional components that perform each of the blocks of the algorithm in the aforementioned flowcharts of FIGS. 11 and/or 13. As such, each block in the aforementioned flowcharts of FIGS. 11 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting a first transmission of one or more CBs to a first device. The example apparatus 1402 also includes means for receiving, from the first device, negative feedback for at least one CB of the first transmission. The example apparatus 1402 also includes means for retransmitting, to the first device, the at least one CB. The example apparatus 1402 also includes means for transmitting, to the first device, an FI indicating to not combine a retransmission of the at least one CB with a prior transmission of the at least one CB. The example apparatus 1402 also includes means for transmitting the FI in an uplink transmission to a base station. The example apparatus 1402 also includes means for determining an error in the prior transmission of the at least one CB and the FI indicates to the base station to flush the prior transmission of the at least one CB. The example apparatus 1402 also includes means for transmitting the FI independent of a CBGTI to a base station. The example apparatus 1402 also includes means for transmitting the FI in connection with a CBGTI. The example apparatus 1402 also includes means for transmitting the FI in a sidelink transmission to a second UE. The example apparatus 1402 also includes means for determining an error in the prior transmission of the at least one CB and the FI indicates to the second UE to flush the prior transmission of the at least one CB. The example apparatus 1402 also includes means for transmitting the FI independent of a sidelink CBGTI to the second UE. The example apparatus 1402 also includes means for transmitting the FI together with a sidelink CBGTI to the second UE. The example apparatus 1402 also includes means for transmitting the FI independent of a Uu CBGTI to the second UE. The example apparatus 1402 also includes means for transmitting the FI in connection with at least one of a Uu CBGTI or a Uu FI.

In another configuration, the apparatus 1402, and in particular the cellular baseband processor 1404, includes means for transmitting a first transmission of one or more CBs to a first device. The example apparatus 1402 also includes means for retransmitting, to the first device, at least one CB of the one or more CBs. The example apparatus 1402 also includes means for transmitting, to the first device, an FI indicating to avoid combining a prior transmission of the at least one CB with the retransmission of the at least one CB.

In another configuration, the example apparatus 1402 also includes means for transmitting the FI in a sidelink transmission to the second UE.

In another configuration, the example apparatus 1402 also includes means for determining an error in the prior transmission of the at least one CB based on an incomplete transmission of the first transmission.

In another configuration, the example apparatus 1402 also includes means for transmitting the FI independent of a sidelink CBGTI to the second UE.

In another configuration, the example apparatus 1402 also includes means for transmitting the FI together with a sidelink CBGTI to the second UE.

In another configuration, the example apparatus 1402 also includes means for relaying communication between a base station and the second UE. The example apparatus 1402 also includes means for transmitting the FI independent of a Uu CBGTI.

In another configuration, the example apparatus 1402 also includes means for relaying communication between a base station and the second UE. The example apparatus 1402 also includes means for transmitting the FI in connection with at least one of a Uu CBGTI or a Uu FI.

In another configuration, the example apparatus 1402 also includes means for transmitting the FI in an uplink transmission to the base station.

In another configuration, the example apparatus 1402 also includes means for determining a resource associated with the prior transmission used to transmit to a sidelink UE in the prior transmission of the at least one CB.

In another configuration, the example apparatus 1402 also includes means for transmitting the FI independent of a CBGTI to the base station.

In another configuration, the example apparatus 1402 also includes means for transmitting the FI in connection with a CBGTI.

In another configuration, the example apparatus 1402 also includes means for retransmitting the at least CB based on receiving negative feedback, from the first device, for the at least one CB of the first transmission.

The aforementioned means may be one or more of the aforementioned components of the apparatus 1402 configured to perform the functions recited by the aforementioned means. As described supra, the apparatus 1402 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 15:
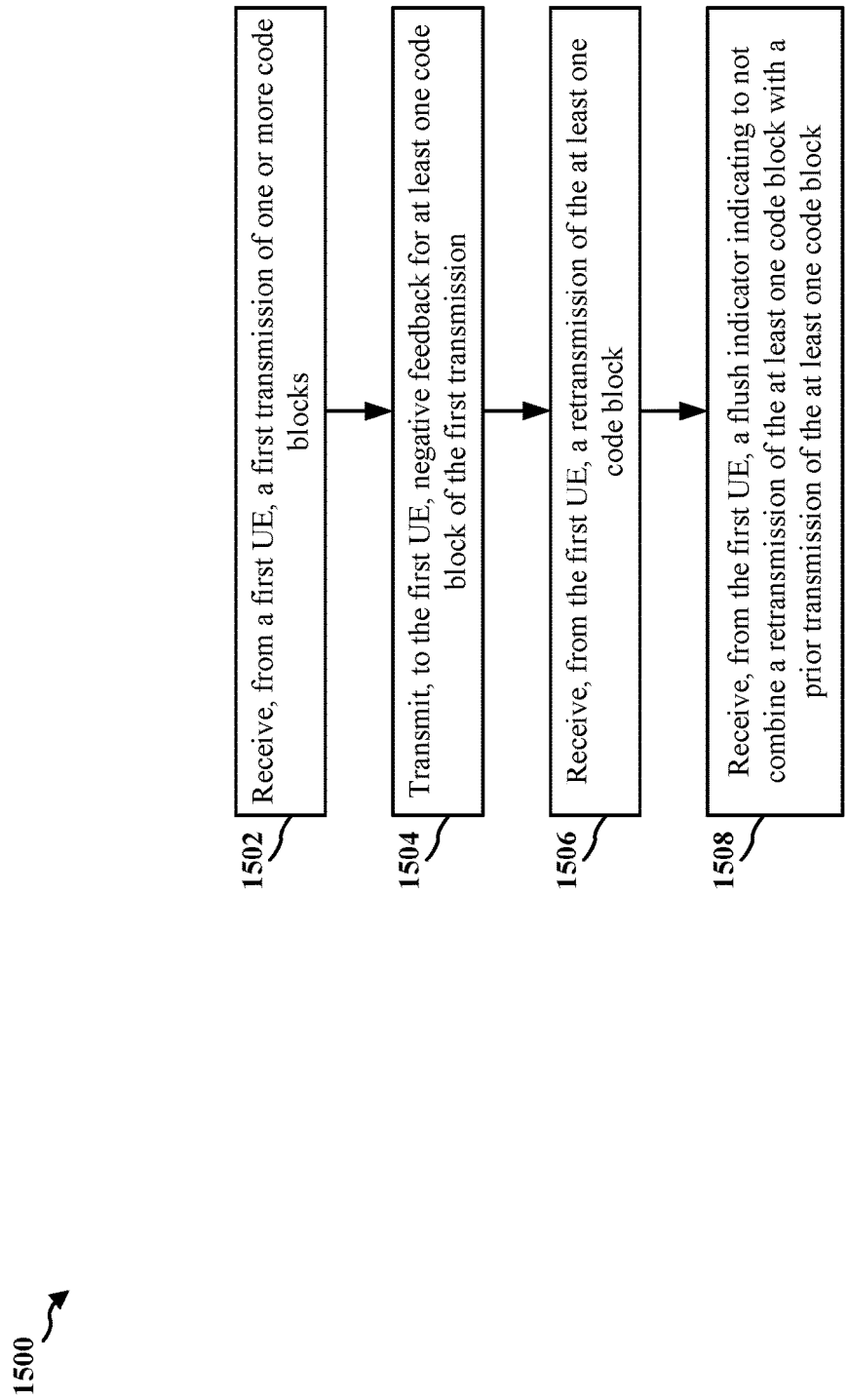
FIG. 15 is a flowchart of a method of wireless communication at an apparatus, in accordance with the teachings disclosed herein.

FIG. 15 is a flowchart 1500 of a method of wireless communication at an apparatus. In some examples, the apparatus may be a base station or a component of a base station (e.g., the base station 102, the base station 180, the first device 310, the base station 602, the base station 702, the base station 802, the base station 906, the receiver 1006, and/or an apparatus 1802 of FIG. 18). In some examples, the apparatus may be a UE (e.g., the UE 104, the second device 350, the second UE 606, the third UE 608, the second UE 806, the second UE 904, the second UE 1004, and/or an apparatus 1802 of FIG. 18). The method may enable a receiver, such as a base station of an uplink transmission or another UE of a sidelink transmission, to help improve decoding of received packets from the apparatus At 1502, the apparatus receives, from a first UE, a first transmission of one or more code blocks, as described in connection with the uplink transmission 720 of FIG. 7 and/or the sidelink transmission 920 of FIG. 9. For example, 1502 may be performed by a first transmission component 1840 of the apparatus 1802 of FIG. 18. In some examples, the apparatus may be a base station and the first transmission may be an uplink transmission, as described above in connection with the example uplink transmission 720 including the code block(s) 722 of FIG. 7. In some examples, the apparatus may be a second UE and the first transmission may be a sidelink transmission, as described above in connection with the example sidelink transmission 920 including the code block(s) 922 of FIG. 9.

At 1504, the apparatus transmits, to the first UE, negative feedback for at least one code block of the first transmission, as described above in connection with the HARQ feedback 740 of FIG. 7 and/or the HARQ feedback 940 of FIG. 9. For example, 1504 may be performed by a feedback component 1842 of the apparatus 1802 of FIG. 18. The negative feedback may include HARQ NACK feedback.

At 1506, the apparatus receives, from the first UE, a retransmission of the at least one code block, as described in connection with the uplink retransmission 760 of FIG. 7 and/or the sidelink retransmission 960 of FIG. 9. For example, 1506 may be performed by a retransmission component 1844 of the apparatus 1802 of FIG. 18. For example, when the apparatus is a base station, the base station may receive the retransmission of the at least one code block in an uplink retransmission, as described above in connection with the example uplink retransmission 760 including the code block(s) 762 of FIG. 7. In some examples, when the apparatus is a second UE, the second UE may receive the retransmission of the at least one code block in a sidelink retransmission, as described above in connection with the example sidelink retransmission 960 including the code block(s) 962 of FIG. 9

At 1508, the apparatus receives, from the first UE, a flush indicator indicating to not combine a retransmission of the at least one code block with a prior transmission of the at least one code block, as described in connection with the flush indicators 724, 764 of FIG. 7, the flush indicator 810 of FIG. 8, the flush indicators 924, 964 of FIG. 9, and/or the flush indicator 1010 of FIG. 10. For example, 1508 may be performed by a flush indicator component 1846 of the apparatus 1802 of FIG. 18.

In examples in which the apparatus is a base station, the apparatus may receive the flush indicators, as described above in connection with the flush indicators 724, 764 of FIG. 7, and/or the flush indicator 810 received at time T3 of FIG. 8. For example, the apparatus may receive the flush indicator in an uplink transmission, as described above in connection with the uplink transmission 720 including the flush indicator 724, and/or in an uplink retransmission, as described above in connection with the uplink retransmission 760 including the flush indicator 764. In some examples, the apparatus receives the flush indicator independent of a CBGTI from the first UE. In some examples, the apparatus receives the flush indicator in connection with a CBGTI from the first UE. In some examples, the flush indicator indicates to the apparatus to flush the prior transmission of the at least one code block and the apparatus receives the retransmission without combining the retransmission of the at least one code block with the prior transmission of the at least one code block.

In some examples, the apparatus determines an error in the prior transmission of the at least one code block, as described above in connection with 750 of FIG. 7, and the flush indicator indicates to the base station to flush the prior transmission of the at least one code block, as described above in connection with the flush indicators 724, 764 of FIG. 7 and/or the transmitting of the flush indicator 810 at time T3 of FIG. 8. In some examples, the error in the prior transmission may be based on an incomplete transmission of the first transmission, as described above in connection with time T2 of FIG. 8.

In some examples, the apparatus is another UE and the apparatus may receive the flush indicators, as described above in connection with the flush indicators 924, 964 of FIG. 9, and/or the flush indicator 1010 received at time T3 of FIG. 10. For example, the apparatus may receive the flush indicator in a sidelink transmission, as described above in connection with the sidelink transmission 920 including the flush indicator 924, and/or in a sidelink retransmission, as described above in connection with the sidelink retransmission 960 including the flush indicator 964. In some examples, the apparatus receives the flush indicator indicating to not combine the retransmission of the at least one code block with the prior transmission of the at least one code block based on an incomplete transmission of the first transmission from the first UE, as described above in connection with the flush indicators 924, 964 of FIG. 9 and/or the receiving of the flush indicator 1010 at time T3 of FIG. 10. In some examples, the apparatus receives the flush indicator independent of a sidelink CBGTI from the first UE. In some examples, the apparatus receives the flush indicator in connection with a sidelink CBGTI from the first UE. In some examples, the first UE relays communication between a base station and the apparatus. In some such examples, the apparatus may receive the flush indicator independent of a Uu CBGTI from the base station. In other examples, the apparatus may receive the flush indicator in connection with at least one of a Uu CBGTI or a Uu FI from the base station.

In some examples, a presence of the flush indicator may be based on configuration information, as described above in connection with the flush indicator configuration 710 of FIG. 7 and/or the flush indicator configuration 910 of FIG. 9. In some examples, the presence of the flush indicator may be based on configuration information (e.g., the flush indicator configuration 710, 910) from at least one of a base station, the second UE via sidelink, or the first UE via the sidelink. For example, the presence of the flush indicator may be indicated in a mode-1 grant DCI (e.g., a resource allocation mode 1 grant DCI) or in SCI on PSCCH.

In some examples, a number of bits of a flush indicator may be based on configuration information, as described above in connection with the flush indicator configuration 710 of FIG. 7 and/or the flush indicator configuration 910 of FIG. 9. In some examples, the number of bits of the flush indicator may be based on configuration information (e.g., the flush indicator configuration 710, 910) from at least one of a base station, the second UE via sidelink, or the first UE via sidelink. For example, the number of bits of the flush indicator may be indicated in a mode-1 grant DCI (e.g., a resource allocation mode 1 grant DCI) or in SCI on PSCCH.

Figure 16:
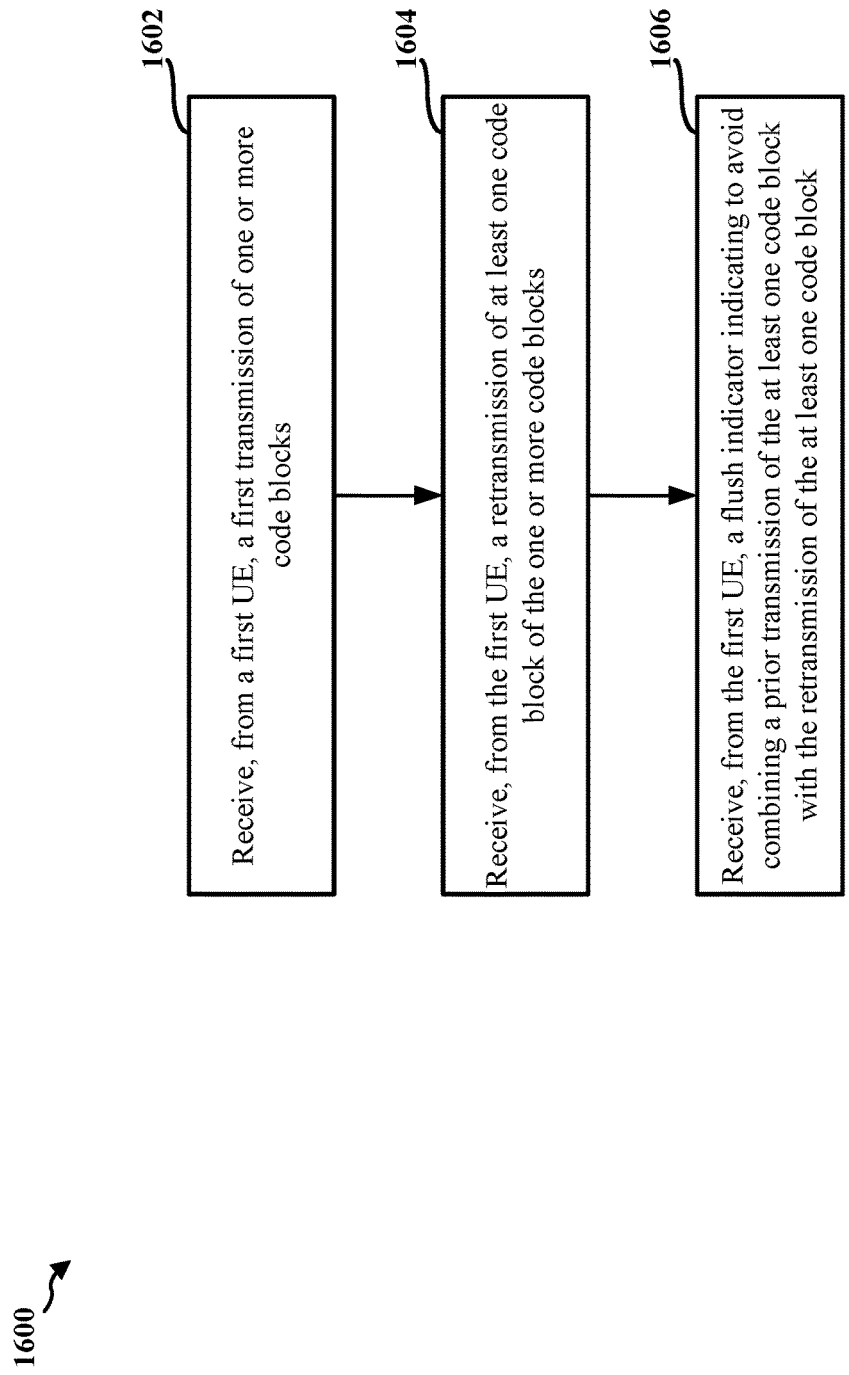
FIG. 16 is a flowchart of a method of wireless communication at a first device, in accordance with the teachings disclosed herein.

FIG. 16 is a flowchart 1600 of a method of wireless communication at a first. In some examples, the first device may be a base station or a component of a base station (e.g., the base station 102, the base station 180, the first device 310, the base station 602, the base station 702, the base station 802, the base station 906, the receiver 1006, and/or an apparatus 1802 of FIG. 18). In some examples, the first device may be a UE (e.g., the UE 104, the second device 350, the second UE 606, the third UE 608, the second UE 806, the second UE 904, the second UE 1004, and/or an apparatus 1802 of FIG. 18). The method may enable a receiver, such as a base station of an uplink transmission or another UE of a sidelink transmission, to help improve decoding of received packets from the apparatus At 1602, the first device receives, from a first UE, a first transmission of one or more code blocks, as described in connection with the uplink transmission 720 of FIG. 7 and/or the sidelink transmission 920 of FIG. 9. For example, 1602 may be performed by a first transmission component 1840 of the apparatus 1802 of FIG. 18.

At 1604, the first device receives, from the first UE, a retransmission of at least one CB of the one or more CBs, as described in connection with the uplink retransmission 760 of FIG. 7 and/or the sidelink retransmission 960 of FIG. 9. For example, 1604 may be performed by a retransmission component 1844 of the apparatus 1802 of FIG. 18.

At 1606, the first device receives, from the first UE, a flush indicator indicating to avoid combining a prior transmission of the at least one code block with the retransmission of the at least one code block, as described in connection with the flush indicators 724, 764 of FIG. 7, the flush indicator 810 of FIG. 8, the flush indicators 924, 964 of FIG. 9, and/or the flush indicator 1010 of FIG. 10. For example, 1606 may be performed by a flush indicator component 1846 of the apparatus 1802 of FIG. 18.

In some examples, a presence of the flush indicator may be based on configuration information, as described above in connection with the flush indicator configuration 710 of FIG. 7 and/or the flush indicator configuration 910 of FIG. 9. In some examples, the presence of the flush indicator may be based on configuration information (e.g., the flush indicator configuration 710, 910) from at least one of a base station, the second UE via sidelink, or the first UE via the sidelink. For example, the presence of the flush indicator may be indicated in a mode-1 grant DCI (e.g., a resource allocation mode 1 grant DCI). In some examples, the presence of the flush indicator may be indicated in SCI on PSCCH.

In some examples, a number of bits of a flush indicator may be based on configuration information, as described above in connection with the flush indicator configuration 710 of FIG. 7 and/or the flush indicator configuration 910 of FIG. 9. In some examples, the number of bits of the flush indicator may be based on configuration information (e.g., the flush indicator configuration 710, 910) from at least one of a base station, the second UE via sidelink, or the first UE via sidelink. For example, the number of bits of the flush indicator may be indicated in a mode-1 grant DCI (e.g., a resource allocation mode 1 grant DCI). In some examples, the number of bits of the flush indicator may be indicated in SCI on PSCCH.

In some examples, the first device may comprise a second UE. In such examples, the second UE may receive the flush indicator (e.g., at 1606) in a sidelink transmission from the first UE.

In some examples, the first device may comprise a base station. In such examples, the base station may receive the flush indicator (e.g., at 1606) in an uplink transmission from the first UE.

Figure 17:
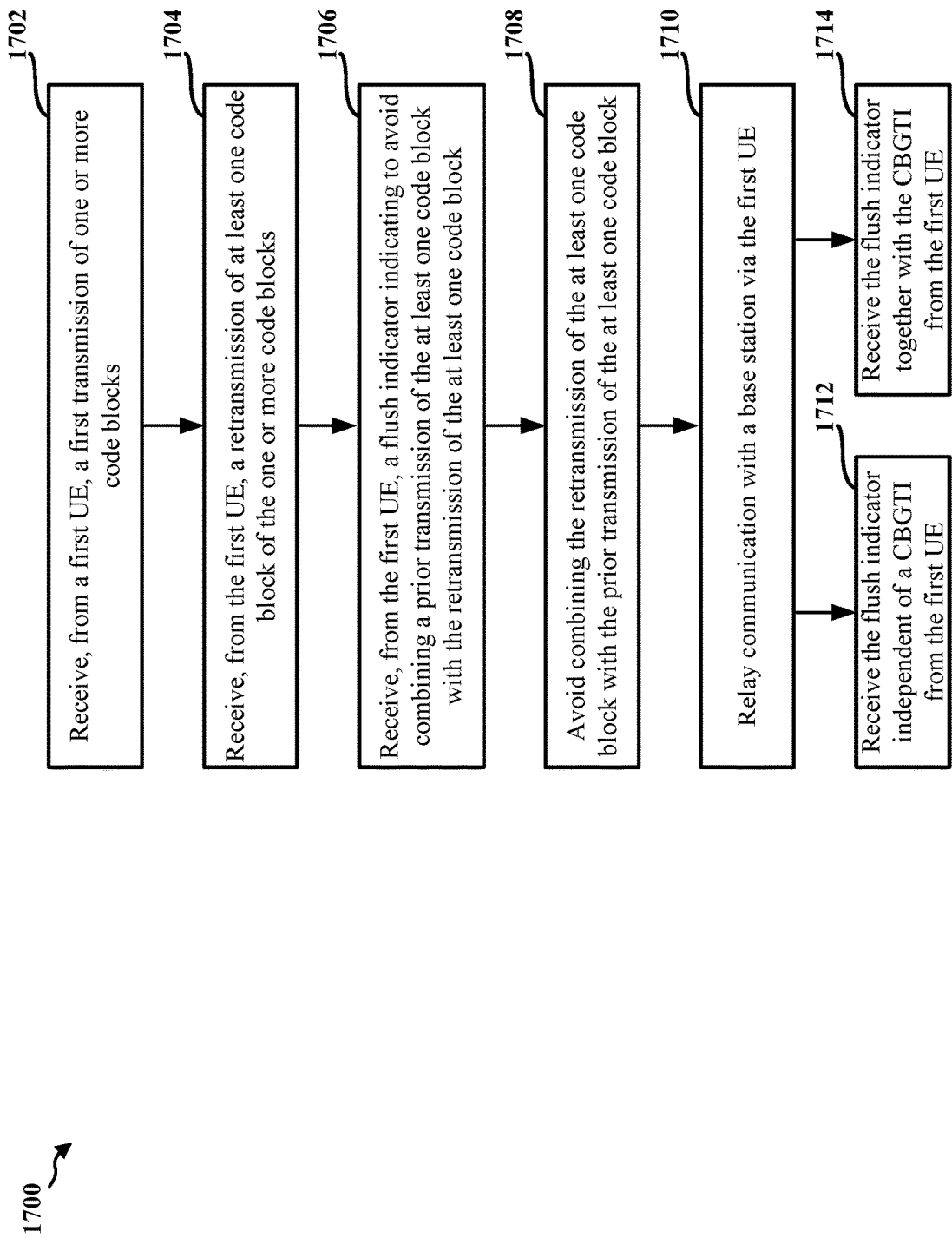
FIG. 17 is a flowchart of a method of wireless communication at a first device, in accordance with the teachings disclosed herein.

FIG. 17 is a flowchart 1700 of a method of wireless communication at a first. In some examples, the first device may be a base station or a component of a base station (e.g., the base station 102, the base station 180, the first device 310, the base station 602, the base station 702, the base station 802, the base station 906, the receiver 1006, and/or an apparatus 1802 of FIG. 18). In some examples, the first device may be a UE (e.g., the UE 104, the second device 350, the second UE 606, the third UE 608, the second UE 806, the second UE 904, the second UE 1004, and/or an apparatus 1802 of FIG. 18). The method may enable a receiver, such as a base station of an uplink transmission or another UE of a sidelink transmission, to help improve decoding of received packets from the apparatus At 1702, the first device receives, from a first UE, a first transmission of one or more code blocks, as described in connection with the uplink transmission 720 of FIG. 7 and/or the sidelink transmission 920 of FIG. 9. For example, 1702 may be performed by a first transmission component 1840 of the apparatus 1802 of FIG. 18.

At 1704, the first device receives, from the first UE, a retransmission of at least one CB of the one or more CBs, as described in connection with the uplink retransmission 760 of FIG. 7 and/or the sidelink retransmission 960 of FIG. 9. For example, 1704 may be performed by a retransmission component 1844 of the apparatus 1802 of FIG. 18.

At 1706, the first device receives, from the first UE, a flush indicator indicating to avoid combining a prior transmission of the at least one code block with the retransmission of the at least one code block, as described in connection with the flush indicators 724, 764 of FIG. 7, the flush indicator 810 of FIG. 8, the flush indicators 924, 964 of FIG. 9, and/or the flush indicator 1010 of FIG. 10. For example, 1706 may be performed by a flush indicator component 1846 of the apparatus 1802 of FIG. 18.

In some examples, a presence of the flush indicator may be based on configuration information, as described above in connection with the flush indicator configuration 710 of FIG. 7 and/or the flush indicator configuration 910 of FIG. 9. In some examples, the presence of the flush indicator may be based on configuration information (e.g., the flush indicator configuration 710, 910) from at least one of a base station, the second UE via sidelink, or the first UE via the sidelink. For example, the presence of the flush indicator may be indicated in a mode-1 grant DCI (e.g., a resource allocation mode 1 grant DCI). In some examples, the presence of the flush indicator may be indicated in SCI on PSCCH.

In some examples, a number of bits of a flush indicator may be based on configuration information, as described above in connection with the flush indicator configuration 710 of FIG. 7 and/or the flush indicator configuration 910 of FIG. 9. In some examples, the number of bits of the flush indicator may be based on configuration information (e.g., the flush indicator configuration 710, 910) from at least one of a base station, the second UE via sidelink, or the first UE via sidelink. For example, the number of bits of the flush indicator may be indicated in a mode-1 grant DCI (e.g., a resource allocation mode 1 grant DCI). In some examples, the number of bits of the flush indicator may be indicated in SCI on PSCCH.

In some examples, the first device may comprise a second UE. In such examples, the second UE may receive the flush indicator (e.g., at 1706) in a sidelink transmission from the first UE.

In some examples, the first device may receive a CBGTI, as described in connection with the CBGTI field 926, 966 of FIG. 9. For example, at 1712, the second UE may receive the flush indicator independent of a sidelink CBGTI from the first UE. For example, 1712 may be performed by an independent CBGTI component 1848 of the apparatus 1802 of FIG. 18.

In some examples, at 1714, the second UE may receive the flush indicator together with a sidelink CBGTI from the first UE. For example, 1714 may be performed by a connected CBGTI component 1850 of the apparatus 1802 of FIG. 18.

In some examples, the first device may relay communication with a base station via the first UE. For example, at 1710, the first may relay communication with the base station via the first UE, as described in connection with the base station 602, the first UE 604, and the second UE 606 of FIG. 6. For example, 1710 may be performed by a relay component 1852 of the apparatus 1802 of FIG. 18.

In some such examples, the first device may receive (e.g., at 1712) the flush indicator independent of a Uu CBGTI. In other examples, the first device may receive (e.g., at 1714) the flush indicator in connection with at least one of a Uu CBGTI or a Uu flush indicator.

In some examples, the first device may comprise a base station. In such examples, the base station may receive the flush indicator (e.g., at 1706) in an uplink transmission from the first UE.

At 1708, the first device may avoid combining the retransmission of the at least one code block with the prior transmission of the at least one code block based on the flush indicator, as described in connection with 730, 770 of FIG. 7. For example, 1708 may be performed by a combination component 1854 of the apparatus 1802 of FIG. 18. For example, the base station may receive the retransmission, at 1704, and the flush indicator, at 1706, and determine to flush buffered data instead of combining the code blocks of the retransmission with the buffered data.

In some examples, the first device may receive CBGTI from the first UE, as described in connection with the CBGTI field 726, 766 of FIG. 7. For example, at 1712, the base station may receive the flush indicator independent of a CBGTI from the first UE. For example, 1712 may be performed by an independent CBGTI component 1848 of the apparatus 1802 of FIG. 18.

In other examples, the base station may receive, at 1714, the flush indicator together with a CBGTI from the first UE. For example, 1714 may be performed by a connected CBGTI component 1850 of the apparatus 1802 of FIG. 18.

Figure 18:
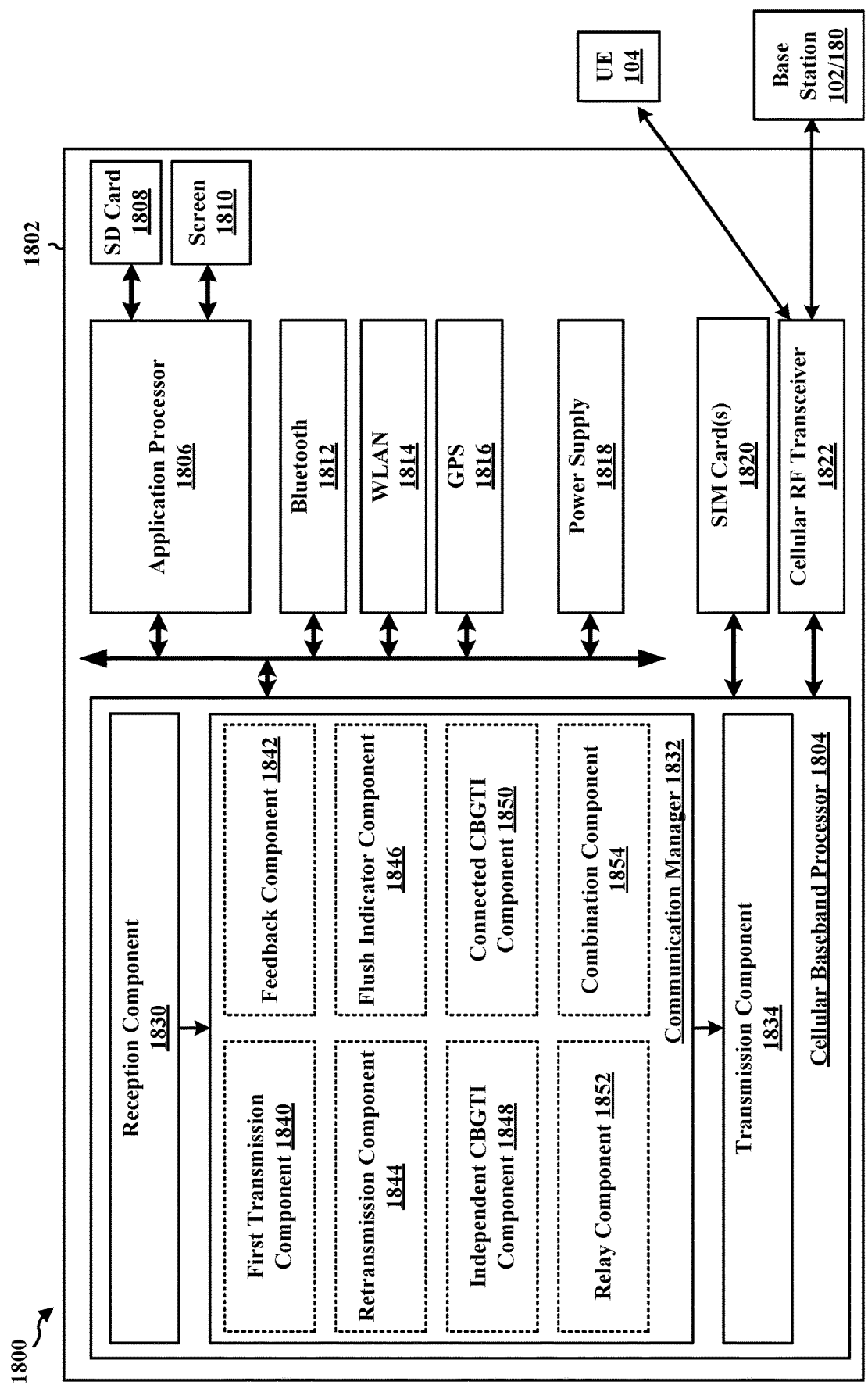
FIG. 18 is a diagram illustrating an example of a hardware implementation for an example apparatus, in accordance with the teachings disclosed herein.

FIG. 18 is a diagram 1800 illustrating an example of a hardware implementation for an apparatus 1802. The apparatus 1802 is a base station and includes a baseband unit 1804. The baseband unit 1804 may communicate through a cellular RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes a first transmission component 1840 that is configured to receive, from a first UE, a first transmission of one or more code blocks, for example, as described in connection with 1502 of FIG. 15. The example first transmission component 1840 may also be configured to receive, from a first UE, a first transmission of one or more code blocks, for example, as described in connection with 1602 of FIG. 16 and/or 1702 of FIG. 17.

The communication manager 1832 also includes a feedback component 1842 that is configured to transmit, to the first UE, negative feedback for at least one code block of the first transmission, for example, as described in connection with 1504 of FIG. 15.

The communication manager 1832 also includes a retransmission component 1844 that is configured to receive, from the first UE, a retransmission of the at least one code block, for example, as described in connection with 1506 of FIG. 15. The example retransmission component 1844 may also be configured to receive, from the first UE, a retransmission of at least one code block of the one or more code blocks, for example, as described in connection with 1604 of FIG. 16 and/or 1704 of FIG. 17.

The communication manager 1832 also includes a flush indicator component 1846 that is configured to receive, from the first UE, a flush indicator indicating to not combine a retransmission of the at least one code block with a prior transmission of the at least one code block, for example, as described in connection with 1508 of FIG. 15. The example flush indicator component 1846 may also be configured to receive, from the first UE, a flush indicator indicating to avoid combining a prior transmission of the at least one code block with the retransmission of the at least one code block, for example, as described in connection with 1606 of FIG. 16 and/or 1706 of FIG. 17

The communication manager 1832 also includes an independent CBGTI component 1848 that is configured to receive the flush indicator independent of a CBGTI from the first UE, for example, as described in connection with 1712 of FIG. 17.

The communication manager 1832 also includes a connected CBTI component 1850 that is configured to receive the flush indicator together with the CBGTI from the first UE, for example, as described in connection with 1714 of FIG. 17.

The communication manager 1832 also includes a relay component 1852 that is configured to relay communication with a base station via the first UE, for example, as described in connection with 1710 of FIG. 17.

The communication manager 1832 also includes a combination component 1854 that is configured to avoid combining the retransmission of the at least one code block with the prior transmission of the at least one code block, for example, as described in connection with 1708 of FIG. 17

The apparatus may include additional components that perform each of the blocks of the algorithm in the aforementioned flowcharts of FIGS. 15 to 17. As such, each block in the aforementioned flowcharts of FIGS. 15 to 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband unit 1804, includes means for receiving, from a first UE a first transmission of one or more CBs. The example apparatus 1802 may also include means for transmitting, to the first UE, negative feedback for at least one CB of the first transmission. The example apparatus 1802 may also include means for receiving, from the first UE, a retransmission of the at least one CB. The example apparatus 1802 may also include means for receiving, from the first UE, an FI indicating to not combine the retransmission of the at least one CB with a prior transmission of the at least one CB. The example apparatus 1802 may also include means for receiving the FI in an uplink transmission from the first UE. The example apparatus 1802 may also include means for receiving the retransmission without combining the retransmission of the at least one CB with the prior transmission of the at least one CB. The example apparatus 1802 may also include means for receiving the FI independent of a CBGTI from the first UE. The example apparatus 1802 may also include means for receiving the FI together with a CBGTI from the first UE. The example apparatus 1802 may also include means for receiving the FI in a sidelink transmission from the first UE. The example apparatus 1802 may also include means for receiving the FI indicating to not combine the retransmission of the at least one CB with the prior transmission of the at least one CB based on an incomplete transmission of the first transmission from the first UE. The example apparatus 1802 may also include means for receiving the FI independent of a sidelink CBGTI from the first UE. The example apparatus 1802 may also include means for receiving the FI together with a sidelink CBGTI from the first UE. The example apparatus 1802 may also include means for receiving the FI independent of a Uu CBGTI from a base station. The example apparatus 1802 may also include means for receiving the FI in connection with at least one of a Uu CBGTI or a Uu FI from a base station.

In another configuration, the apparatus 1802, and in particular the baseband unit 1804, includes means for receiving, from a first UE, a first transmission of one or more CBs. The example apparatus 1802 also includes means for receiving, from the first UE, a retransmission of at least one CB of the one or more CBs. The example apparatus 1802 also includes means for receiving, from the first UE, an FI indicating to avoid combining a prior transmission of the at least one CB with the retransmission of the at least one CB.

In another configuration, the example apparatus 1802 also includes means for receiving the FI in a sidelink transmission from the first UE.

In another configuration, the example apparatus 1802 also includes means for receiving the FI independent of a sidelink CBGTI from the first UE.

In another configuration, the example apparatus 1802 also includes means for receiving the FI together with a sidelink CBGTI from the first UE.

In another configuration, the example apparatus 1802 also includes means for relaying communication with a base station via the first UE. The example apparatus 1802 also includes means for receiving the FI independent of a Uu CBGTI.

In another configuration, the example apparatus 1802 also includes means for relaying communication with a base station via the UE. The example apparatus 1802 also includes means for receiving the FI in connection with at least one of a Uu CBGTI or a Uu CBGFI.

In another configuration, the example apparatus 1802 also includes means for receiving the FI in an uplink transmission from the first UE.

In another configuration, the example apparatus 1802 also includes means for receiving the retransmission and avoid combining the retransmission of the at least one CB with the prior transmission of the at least one CB.

In another configuration, the example apparatus 1802 also includes means for receiving the FI independent of a CBGTI from the first UE.

In another configuration, the example apparatus 1802 also includes means for receiving the FI together with a CBGTI from the first UE.

The aforementioned means may be one or more of the aforementioned components of the apparatus 1802 configured to perform the functions recited by the aforementioned means. As described supra, the apparatus 1802 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Aspects disclosed herein enable a UE to transmit a flush indicator indicating to a receiving device (e.g., a base station or another UE) to avoid combining a prior transmission of at least one code block with the retransmission of the at least one code block. Aspects presented herein may improve communication between a transmitter and a receiver by providing a flush indicator in uplink transmissions and/or sidelink transmissions. The transmitter may be a UE and configured to transmit uplink transmissions to the receiver (e.g., a base station) and/or configured to transmit sidelink transmissions to the receiver (e.g., another UE). The transmitter may also be configured to receive feedback at a transport block level, at a code block level, or at a code block group level. The flush indicator may be configured to be a single-bit field or a multi-bit field. In some examples, the flush indicator may be configured to cause the receiver to flush a prior transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: transmitting a first transmission of one or more CBs to a first device; receiving, from the first device, negative feedback for at least one CB of the first transmission; retransmitting, to the first device, the at least one CB; and transmitting, to the first device, an FI indicating to not combine a retransmission of the at least one CB with a prior transmission of the at least one CB.

Aspect 2 is the method of aspect 1, further including that the first device is a base station, and the UE transmits the FI in an uplink transmission to the base station.

Aspect 3 is the method of any of aspect 1 or aspect 2, further including that the UE determines an error in the prior transmission of the at least one CB and the FI indicates to the base station to flush the prior transmission of the at least one CB.

Aspect 4 is the method of any of aspects 1 to 3, further including that the UE transmits the FI independent of a CBGTI to the base station.

Aspect 5 is the method of any of aspects 1 to 3, further including that the UE transmits the FI in connection with a CBGTI.

Aspect 6 is the method of aspect 1, further including that the first device is a second UE, and the UE transmits the FI in a sidelink transmission to the second UE.

Aspect 7 is the method of any of aspect 1 or aspect 6, further including that the UE determines an error in the prior transmission of the at least one CB and the FI indicates to the second UE to flush the prior transmission of the at least one CB.

Aspect 8 is the method of any of aspects 1, 6, or 7, further including that the error in the prior transmission is based on an incomplete transmission of the first transmission.

Aspect 9 is the method of any of aspects 1, or 6 to 8, further including that the UE transmits the FI independent of a sidelink CBGTI to the second UE.

Aspect 10 is the method of any of aspects 1, or 6 to 8, further including that the UE transmits the FI together with a sidelink CBGTI to the second UE.

Aspect 11 is the method of any of aspects 1, or 6 to 10, further including that the UE relays communication between a base station and the second UE, and wherein the UE transmits the FI independent of a Uu CBGTI to the second UE.

Aspect 12 is the method of any of aspects 1, or 6 to 11, further including that the UE relays communication between a base station and the second UE, and wherein the UE transmits the FI in connection with at least one of a Uu CBGTI or a Uu FI.

Aspect 13 is the method of any of aspects 1, or 6 to 12, further including that a presence of the FI is based on configuration information from at least one of: a base station, the second UE, or the UE as a sidelink transmitter.

Aspect 14 is the method of any of aspects 1, or 6 to 13, further including that a presence of the FI is indicated in sidelink control information on a physical sidelink control channel.

Aspect 15 is the method of any of aspects 1, or 6 to 14, further including that a number of bits of the FI is based on configuration information from at least one of: a base station, the second UE, or the UE as a sidelink transmitter.

Aspect 16 is the method of any of aspects 1, or 6 to 15, further including that a number of bits of the FI is indicated in sidelink control information on a physical sidelink control channel.

Aspect 17 is an apparatus for wireless communication including a memory and at least one processor coupled to a memory, the memory and the at least one processor configured to implement a method as in any of aspects 1 to 16.

Aspect 18 is an apparatus for wireless communication including means for implementing a method as in any of aspects 1 to 16.

Aspect 19 is a non-transitory computer-readable storage medium storing computer executable code, where the code, when executed, causes a processor to implement a method as in any of aspects 1 to 16.

Aspect 20 is a method of wireless communication at a first device, comprising: receiving, from a first UE a first transmission of one or more CBs; transmitting, to the first UE, negative feedback for at least one CB of the first transmission; receiving, from the first UE, a retransmission of the at least one CB; and receiving, from the first UE, an FI indicating to not combine the retransmission of the at least one CB with a prior transmission of the at least one CB.

Aspect 21 is the method of aspect 20, further including that the first device comprises a base station that receives the FI in an uplink transmission from the first UE.

Aspect 22 is the method of any of aspect 20 or aspect 21, further including that the FI indicates to the base station to flush the prior transmission of the at least one CB, the method further comprising: receiving the retransmission without combining the retransmission of the at least one CB with the prior transmission of the at least one CB.

Aspect 23 is the method of any of aspects 20 to 22, further including that the first device receives the FI independent of a CBGTI from the first UE.

Aspect 24 is the method of any of aspects 20 to 22, further including that the first device receives the FI together with a CBGTI from the first UE.

Aspect 25 is the method of aspect 20, further including that the first device comprises a second UE that receives FI in a sidelink transmission from the first UE.

Aspect 26 is the method of any of aspect 20 or aspect 25, further including that the second UE receives the FI indicating to not combine the retransmission of the at least one CB with the prior transmission of the at least one CB based on an incomplete transmission of the first transmission from the first UE.

Aspect 27 is the method of any of aspects 20 or 25 to 26, further including that the second UE receives the FI independent of a sidelink CBGTI from the first UE.

Aspect 28 is the method of any of aspects 20 or 25 to 26, further including that the second UE receives the FI together with a sidelink CBGTI from the first UE.

Aspect 29 is the method of any of aspects 20 or 25 to 28, further including that the first UE relays communication between a base station and the second UE, and wherein the second UE receives the FI independent of a Uu CBGTI from the base station.

Aspect 30 is the method of any of aspects 20 or 25 to 28, further including that the first UE relays communication between a base station and the second UE, and wherein the second UE receives the FI in connection with at least one of a Uu CBGTI or a Uu CBGFI from the base station.

Aspect 31 is the method of any of aspects 20 or 25 to 30, further including that a presence of the FI is based on configuration information from at least one of: a base station, the second UE via sidelink, or the first UE via the sidelink.

Aspect 32 is the method of any of aspects 20 or 25 to 31, further including that a presence of the FI is indicated in sidelink control information on a physical sidelink control channel.

Aspect 33 is the method of any of aspects 20 or 25 to 32, further including that a number of bits of the FI is based on configuration information from at least one of: a base station, the second UE via sidelink, or the first UE via the sidelink.

Aspect 34 is the method of any of aspects 20 or 25 to 33, further including that a number of bits of the FI is indicated in sidelink control information on a physical sidelink control channel.

Aspect 35 is an apparatus for wireless communication including a memory and at least one processor coupled to a memory, the memory and the at least one processor configured to implement a method as in any of aspects 20 to 34.

Aspect 36 is an apparatus for wireless communication including means for implementing a method as in any of aspects 20 to 34.

Aspect 37 is a non-transitory computer-readable storage medium storing computer executable code, where the code, when executed, causes a processor to implement a method as in any of aspects 20 to 34.

Aspect 38 is a method of wireless communication at a UE, comprising: transmitting a first transmission of one or more CBs to a first device; retransmitting, to the first device, at least one CB of the one or more CBs; and transmitting, to the first device, an FI indicating to avoid combining a prior transmission of the at least one CB with the retransmission of the at least one CB.

Aspect 39 is the method of aspect 38, further including that the first device is a second UE, and wherein the method further comprises: transmitting the FI in a sidelink transmission to the second UE.

Aspect 40 is the method of any of aspect 38 or aspect 39, further including: determining an error in the prior transmission of the at least one CB based on an incomplete transmission of the first transmission, wherein the FI indicates to the second UE to flush the prior transmission of the at least one CB.

Aspect 41 is the method of any of aspects 38 to 40, further including: transmitting the FI independent of a sidelink CBGTI to the second UE.

Aspect 42 is the method of any of aspects 38 to 40, further including: transmitting the FI together with a sidelink CBGTI to the second UE.

Aspect 43 is the method of any of aspects 38 to 42, further including: relaying communication between a base station and the second UE, and transmitting the FI independent of a Uu CBGTI.

Aspect 44 is the method of any of aspects 38 to 42, further including: relaying communication between a base station and the second UE, and transmitting the FI in connection with at least one of a Uu CBGTI or a Uu FI.

Aspect 45 is the method of any of aspects 38 to 44, further including that a presence of the FI is based on configuration information from at least one of: a base station, the second UE, or the UE as a sidelink transmitter.

Aspect 46 is the method of any of aspects 38 to 45, further including that a presence of the FI is indicated in sidelink control information on a physical sidelink control channel.

Aspect 47 is the method of any of aspects 38 to 46, further including that a number of bits of the FI is based on configuration information from at least one of: a base station, the second UE, or the UE as a sidelink transmitter.

Aspect 48 is the method of any of aspects 38 to 47, further including that a number of bits of the FI is indicated in sidelink control information on a physical sidelink control channel.

Aspect 49 is the method of aspect 38, further including that the first device is a base station, and wherein the method further comprises: transmitting the FI in an uplink transmission to the base station.

Aspect 50 is the method of any of aspect 38 or aspect 49, further including: determining a resource associated with the prior transmission used to transmit to a sidelink UE in the prior transmission of the at least one CB.

Aspect 51 is the method of any of aspects 38 or 49 to 50, further including: transmitting the FI independent of a CBGTI to the base station.

Aspect 52 is the method of any of aspects 38 or 49 to 50, further including: transmitting the FI in connection with a CBGTI.

Aspect 53 is the method of any of aspects 38 or 49 to 52, further including: retransmitting the at least CB based on receiving negative feedback, from the first device, for the at least one CB of the first transmission.

Aspect 54 is an apparatus for wireless communication including a memory and at least one processor coupled to a memory, the memory and the at least one processor configured to implement a method as in any of aspects 38 to 53.

Aspect 55 is an apparatus for wireless communication including means for implementing a method as in any of aspects 38 to 53.

Aspect 56 is a non-transitory computer-readable storage medium storing computer executable code, where the code, when executed, causes a processor to implement a method as in any of aspects 38 to 53.

Aspect 57 is a method of wireless communication at a first device, comprising: receiving, from a first UE, a first transmission of one or more CBs; receiving, from the first UE, a retransmission of at least one CB of the one or more CBs; and receiving, from the first UE, an FI indicating to avoid combining a prior transmission of the at least one CB with the retransmission of the at least one CB.

Aspect 58 is the method of aspect 57, further including the first device comprises a second UE, and wherein the method further comprises: receiving the FI in a sidelink transmission from the first UE.

Aspect 59 is the method of any of aspect 57 or aspect 58, further including: receiving the FI independent of a sidelink CBGTI from the first UE.

Aspect 60 is the method of any of aspects 57 to 59, further including: receiving the FI together with a sidelink CBGTI from the first UE.

Aspect 61 is the method of any of aspects 57 to 59, further including: relaying communication with a base station via the first UE, and receiving the FI independent of a Uu CBGTI.

Aspect 62 is the method of any of aspects 57 to 61, further including: relaying communication with a base station via the UE, and receiving the FI in connection with at least one of a Uu CBGTI or a Uu CBGFI.

Aspect 63 is the method of any of aspects 57 to 61, further including that a presence of the FI is based on configuration information from at least one of: a base station, the second UE via sidelink, or the first UE via the sidelink.

Aspect 64 is the method of any of aspects 57 to 63, further including that a presence of the FI is indicated in sidelink control information on a physical sidelink control channel.

Aspect 65 is the method of any of aspects 57 to 64, further including that a number of bits of the FI is based on configuration information from at least one of: a base station, the second UE via sidelink, or the first UE via the sidelink.

Aspect 66 is the method of any of aspects 57 to 65, further including that a number of bits of the FI is indicated in sidelink control information on a physical sidelink control channel.

Aspect 67 is the method of aspect 57, further including that the first device comprises a base station, and wherein the method further comprises: receiving the FI in an uplink transmission from the first UE.

Aspect 68 is the method of any of aspect 57 or aspect 67, further including that the FI indicates to flush the prior transmission of the at least one CB, and wherein to the method further comprises: receiving the retransmission and avoid combining the retransmission of the at least one CB with the prior transmission of the at least one CB.

Aspect 69 is the method of any of aspects 57 or 67 to 68, further including: receiving the FI independent of a CBGTI from the first UE.

Aspect 70 is the method of any of aspects 57 or 67 to 68, further including: receiving the FI together with a CBGTI from the first UE.

Aspect 71 is an apparatus for wireless communication including a memory and at least one processor coupled to a memory, the memory and the at least one processor configured to implement a method as in any of aspects 57 to 70.

Aspect 72 is an apparatus for wireless communication including means for implementing a method as in any of aspects 57 to 70.

Aspect 73 is a non-transitory computer-readable storage medium storing computer executable code, where the code, when executed, causes a processor to implement a method as in any of aspects 57 to 70.

What is claimed is:

1. An apparatus for wireless communication at a first user equipment (UE), comprising:
   memory; and
   one or more processors coupled to the memory, the one or more processors configured to cause the first UE to:
   obtain configuration information associated with a flush indicator (FI), the configuration information indicating a length of the FI in one or more sidelink transmissions;
   transmit a first transmission of the one or more sidelink transmissions to a second UE, the first transmission including one or more code blocks (CBs);
   transmit, to the second UE, a retransmission of at least one code block (CB) of the one or more CBs; and
   transmit, via sidelink, the FI to the second UE based on the configuration information, the FI indicating to the second UE to avoid combining a prior transmission of the at least one CB with the retransmission of the at least one CB.

2. The apparatus of claim 1, further comprising:
   at least one antenna coupled to the one or more processors, wherein the one or more processors are further configured to cause the first UE to:
   determine an error in the prior transmission of the at least one CB based on an incomplete transmission of the first transmission,
   wherein the FI is configured to indicate to the second UE to flush the prior transmission of the at least one CB.

3. The apparatus of claim 1, wherein the one or more processors are further configured to cause the first UE to:
   transmit the FI independently of a sidelink code block group transmission indicator (CBGTI) to the second UE.

4. The apparatus of claim 1, wherein the one or more processors are further configured to cause the first UE to:
   transmit the FI together with a sidelink code block group transmission indicator (CBGTI) to the second UE.

5. The apparatus of claim 1, wherein the one or more processors are further configured to cause the first UE to:
   relay communication between a network node and the second UE, and transmit the FI independently of a Uu code block group transmission indicator (CBGTI).

6. The apparatus of claim 1, wherein the one or more processors are further configured to cause the first UE to:
   relay communication between a network node and the second UE, and transmit the FI in connection with at least one of a Uu code block group transmission indicator (CBGTI) or a Uu FI.

7. The apparatus of claim 1, wherein the configuration information is obtained from at least one of:
   a network node, or
   the second UE.

8. The apparatus of claim 1, wherein the configuration information is indicated in sidelink control information on a physical sidelink control channel.

9. The apparatus of claim 1, wherein a number of bits of the FI is based on the configuration information and obtained from at least one of:
   a network node, or
   the second UE.

10. The apparatus of claim 1, wherein a number of bits of the FI is based on the configuration information and indicated in sidelink control information on a physical sidelink control channel.

11. The apparatus of claim 1, wherein the one or more processors are, individually or in combination, configured to obtain the configuration information associated with the FI, transmit the first transmission of the one or more sidelink transmissions to the second UE, transmit the retransmission of the at least one CB of the one or more CBs, and transmit the FI to the second UE based on the configuration information.

12. An apparatus for wireless communication with a first user equipment (UE) at a second UE, comprising:
memory; and
one or more processors coupled to the memory, the one or more processors configured to cause the second UE to:
obtain configuration information associated with a flush indicator (FI), the configuration information indicating a length of the FI in one or more sidelink transmissions;
receive, from the first UE, a first transmission of the one or more sidelink transmissions, the first transmission including one or more code blocks (CBs);
receive, from the first UE, a retransmission of at least one code block (CB) of the one or more CBs; and
receive, via sidelink, the FI from the first UE based on the configuration information, the FI indicating to the second UE to avoid combining a prior transmission of the at least one CB with the retransmission of the at least one CB.

13. The apparatus of claim 12, further comprising:
at least one antenna coupled to the one or more processors, wherein the one or more processors are further configured to cause the second UE to:
receive the FI independently of a sidelink code block group transmission indicator (CBGTI) from the first UE.

14. The apparatus of claim 12, wherein the one or more processors are further configured to cause the second UE to:
receive the FI together with a sidelink code block group transmission indicator (CBGTI) from the first UE.

15. The apparatus of claim 12, wherein the one or more processors are further configured to cause the second UE to:
relay communication with a network node via the first UE, and receive the FI independently of a Uu code block group transmission indicator (CBGTI).

16. The apparatus of claim 12, wherein the one or more processors are further configured to cause the second UE to:
relay communication with a network node via the first UE, and
receive the FI in connection with at least one of a Uu code block group transmission indicator (CBGTI) or a Uu FI.

17. The apparatus of claim 12, wherein the configuration information is obtained from at least one of:
a network node, the first UE via the sidelink.

18. The apparatus of claim 12, wherein the configuration information is indicated in sidelink control information on a physical sidelink control channel.

19. The apparatus of claim 12, wherein a number of bits of the FI is based on the configuration information and obtained from at least one of:
a network node, or the first UE via the sidelink.

20. The apparatus of claim 12, wherein a number of bits of the FI is based on the configuration information and indicated in sidelink control information on a physical sidelink control channel.

21. The apparatus of claim 12, wherein the one or more processors are, individually or in combination, configured to obtain the configuration information associated with the FI, receive the first transmission of the one or more sidelink transmissions, receive the retransmission of the at least one CB of the one or more CBs, and receive the FI from the first UE based on the configuration information.

22. A method of wireless communication at a first user equipment (UE), comprising:
obtaining, at the first UE, configuration information associated with a flush indicator (FI), the configuration information indicating a length of the FI in one or more sidelink transmissions;
transmitting a first transmission of the one or more sidelink transmissions to a second UE, the first transmission including one or more code blocks (CBs);
transmitting, to the second UE, a retransmission of at least one code block (CB) of the one or more CBs; and
transmitting, via sidelink, the FI to the second UE based on the configuration information, the FI indicating to the second UE to avoid combining a prior transmission of the at least one CB with the retransmission of the at least one CB.

23. The method of claim 22, further comprising:
determining an error in the prior transmission of the at least one CB based on an incomplete transmission of the first transmission, and wherein the FI indicates to the second UE to flush the prior transmission of the at least one CB.

24. The method of claim 22, further comprising:
transmitting the FI independently of a sidelink code block group transmission indicator (CBGTI) to the second UE.

25. The method of claim 22, wherein a number of bits of the FI is based on the configuration information.

26. A non-transitory computer-readable storage medium comprising computer-executable code for wireless communication at a first user equipment (UE), the computer-executable code when executed by one or more processors causes the one or more processors to cause the first UE to:
obtain configuration information associated with a flush indicator (FI), the configuration information indicating a length of the FI in one or more sidelink transmissions;
transmit a first transmission of the one or more sidelink transmissions to a second UE, the first transmission including one or more code blocks (CBs);
transmit, to the second UE, a retransmission of at least one code block (CB) of the one or more CBs; and
transmit, via sidelink, the FI to the second UE based on the configuration information, the FI indicating to the second UE to avoid combining a prior transmission of the at least one CB with the retransmission of the at least one CB.

27. The non-transitory computer-readable storage medium of claim 26, wherein the computer-executable code when executed by the one or more processors causes the one or more processors to cause the first UE to:
determine an error in the prior transmission of the at least one CB based on an incomplete transmission of the first transmission, and wherein the FI indicates to the second UE to flush the prior transmission of the at least one CB.

28. The non-transitory computer-readable storage medium of claim 26, wherein the computer-executable code when executed by the one or more processors causes the one or more processors to cause the first UE to:
transmit the FI independently of a sidelink code block group transmission indicator (CBGTI) to the second UE.

29. The non-transitory computer-readable storage medium of claim 26, wherein a number of bits of the FI is based on the configuration information.

30. A method of wireless communication with a first user equipment (UE) at a second UE, comprising:

obtaining, at the second UE, configuration information associated with a flush indicator (FI), the configuration information indicating a length of the FI in one or more sidelink transmissions;

receiving, from the first UE, a first transmission of the one or more sidelink transmissions, the first transmission including one or more code blocks (CBs);

receiving, from the first UE, a retransmission of at least one code block (CB) of the one or more CBs; and receiving, via sidelink, the FI from the first UE based on the configuration information, the FI indicating to the second UE to avoid combining a prior transmission of the at least one CB with the retransmission of the at least one CB.

31. The method of claim 30, further comprising:

receiving the FI independently of a sidelink code block group transmission indicator (CBGTI) from the first UE.

32. The method of claim 30, wherein a number of bits of the FI is based on the configuration information and indicated in sidelink control information on a physical sidelink control channel.

33. A non-transitory computer-readable storage medium comprising computer-executable code for wireless communication with a first user equipment (UE) at a second UE, the computer-executable code when executed by one or more processors causes the one or more processors to cause the second UE to:

obtain, at the second UE, configuration information associated with a flush indicator (FI), the configuration information indicating a length of the FI in one or more sidelink transmissions;

receive, from the first UE, a first transmission of the one or more sidelink transmissions, the first transmission including one or more code blocks (CBs);

receive, from the first UE, a retransmission of at least one code block (CB) of the one or more CBs; and receive, via sidelink, the FI from the first UE based on the configuration information, the FI indicating to the second UE to avoid combining a prior transmission of the at least one CB with the retransmission of the at least one CB.

34. The non-transitory computer-readable storage medium of claim 33, wherein the computer-executable code when executed by the one or more processors causes the one or more processors to cause the second UE to:

receive the FI independently of a sidelink code block group transmission indicator (CBGTI) from the first UE.

35. The non-transitory computer-readable storage medium of claim 33, wherein a number of bits of the FI is based on the configuration information and indicated in sidelink control information on a physical sidelink control channel.

\* \* \* \* \*